(12) United States Patent
Chaudhuri et al.

(10) Patent No.: US 7,885,390 B2
(45) Date of Patent: Feb. 8, 2011

(54) SYSTEM AND METHOD FOR MULTI-MODAL PERSONAL COMMUNICATION SERVICES

(75) Inventors: Aloke Chaudhuri, Victor, NY (US); Michael G. Thorpe, Fairport, NY (US)

(73) Assignee: Soleo Communications, Inc., Fairport, NY (US)

( * ) Notice: Subject to any disclaimer, the term of this patent is extended or adjusted under 35 U.S.C. 154(b) by 1422 days.

(21) Appl. No.: 11/240,844

(22) Filed: Sep. 30, 2005

(65) Prior Publication Data

US 2007/0036294 A1    Feb. 15, 2007

Related U.S. Application Data

(60) Provisional application No. 60/695,938, filed on Jul. 1, 2005.

(51) Int. Cl.
    *H04M 11/00*    (2006.01)
(52) U.S. Cl. ............. 379/88.16; 379/93.12; 379/265.02
(58) Field of Classification Search ............. 379/88.25, 379/265.01–265.14, 88.17, 88.18, 88.16, 379/93.12
    See application file for complete search history.

(56) References Cited

U.S. PATENT DOCUMENTS

| | | | |
|---|---|---|---|
| 6,349,290 B1 * | 2/2002 | Horowitz et al. .............. 705/35 |
| 6,404,884 B1 | 6/2002 | Marwell et al. | |
| 6,411,946 B1 | 6/2002 | Chaudhuri | |
| 6,487,277 B2 * | 11/2002 | Beyda et al. ............. 379/88.01 |
| 6,580,904 B2 | 6/2003 | Cox et al. | |
| 6,584,181 B1 * | 6/2003 | Aktas et al. ............. 379/88.23 |
| 6,625,444 B1 | 9/2003 | Fleming, III et al. | |
| 6,668,055 B2 | 12/2003 | Marwell et al. | |
| 6,731,927 B1 | 5/2004 | Stern et al. | |
| 6,792,082 B1 | 9/2004 | Levine | |
| 6,801,763 B2 | 10/2004 | Elsey et al. | |
| 6,816,727 B2 | 11/2004 | Cox et al. | |
| 6,999,563 B1 | 2/2006 | Thorpe et al. | |
| 7,065,188 B1 * | 6/2006 | Mei et al. ................. 379/88.23 |
| 7,092,370 B2 * | 8/2006 | Jiang et al. ................... 370/329 |
| 7,184,534 B2 * | 2/2007 | Birch et al. ............ 379/211.01 |
| 2002/0055351 A1 | 5/2002 | Elsey et al. | |
| 2002/0143548 A1 | 10/2002 | Korall et al. | |
| 2003/0032409 A1 | 2/2003 | Hutcheson et al. | |
| 2003/0115288 A1 | 6/2003 | Ljubicich et al. | |
| 2003/0119492 A1 | 6/2003 | Timmins et al. | |
| 2003/0216145 A1 | 11/2003 | Cox et al. | |
| 2004/0015380 A1 | 1/2004 | Timmins | |
| 2004/0023644 A1 | 2/2004 | Montemer | |
| 2004/0029567 A1 | 2/2004 | Timmins et al. | |
| 2004/0058710 A1 | 3/2004 | Timmins et al. | |
| 2004/0132433 A1 | 7/2004 | Stern et al. | |

(Continued)

*Primary Examiner*—Simon Sing
(74) *Attorney, Agent, or Firm*—Marjama, Muldoon, Blasiak & Sullivan LLP

(57) ABSTRACT

A system for personalizing interactive services provided to users of voice and data enabled communications devices, including users of SMS, MMS and WAP enabled communications devices. The system is designed to access source information associated with a particular requester for a service and to map the source information to personalization information associated with a user of the system. The source information is extracted in various embodiments from different types of communications channels. The personalization information is employed by the system to influence the behavior of the system while providing an interactive service to the user.

57 Claims, 8 Drawing Sheets

U.S. PATENT DOCUMENTS

| | | |
|---|---|---|
| 2004/0156494 A1 | 8/2004 | Pines et al. |
| 2004/0166832 A1 | 8/2004 | Portman et al. |
| 2004/0198329 A1 | 10/2004 | Vasa |
| 2004/0203634 A1 | 10/2004 | Wang et al. |
| 2004/0247092 A1 | 12/2004 | Timmins et al. |
| 2004/0259535 A1 | 12/2004 | Elsey et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0003837 A1 | 1/2005 | Midkiff et al. |
| 2005/0037744 A1 | 2/2005 | Pines et al. |
| 2005/0038876 A1 | 2/2005 | Chaudhuri |
| 2005/0047560 A1 | 3/2005 | Mostad |
| 2005/0054333 A1 | 3/2005 | Johnson |
| 2005/0070260 A1 | 3/2005 | Mazzara, Jr. |
| 2005/0074112 A1 | 4/2005 | Timmins |
| 2005/0276391 A1 | 12/2005 | Ibbotson et al. |

* cited by examiner

SYSTEM AND METHOD FOR MULTI-MODAL PERSONAL COMMUNICATION SERVICES

CROSS-REFERENCE TO RELATED APPLICATIONS

This patent application is related to a provisional U.S. patent application, having Ser. No. 60/695,938, filed Jul. 1, 2005 and that is titled "Line Interface Memory Module", which is incorporated herein by reference in its entirety.

CROSS-REFERENCE TO APPLICATIONS INCLUDING RELATED SUBJECT MATTER

This patent application includes subject matter that is related to that of U.S. patent application Ser. No. 11/177,631, that is titled "A System and Method for Providing Wireless Data and Voice Based Services", filed Jul. 8, 2005 and which is incorporated herein by reference in its entirety.

FIELD OF THE INVENTION

This invention relates generally to a system and a method for providing interactive voice and data based services to users of voice and data enabled communications devices, and specifically to personalizing voice and data based interactive services to users of voice and data enabled communications devices.

SUMMARY OF THE INVENTION

The system of the invention provides for personalizing interactive services to users of data and voice enabled communications devices, including users of wire line and wireless (VoWLAN/VoWiFi) voice and short message service (SMS), wireless application protocol (WAP) and multimedia messaging service (MMS) protocol enabled communications devices. The system is designed to access source information associated with a requester (user) of a service and to map the source information to personalization information associated with a user of the system. The source information is extracted from at least one of different types of communications channels provided by the system. The at least one communications channel is determined based upon the type of communications channel the requester elects to use when contacting the system. The personalization information is employed by the system to influence the behavior one or more interactive services that are provided by the system to the user.

BRIEF DESCRIPTION OF THE DRAWINGS

The objects and features of the invention can be better understood with reference to the claims and drawings described below. The drawings are not necessarily to scale, the emphasis is instead generally being placed upon illustrating the principles of the invention. Within the drawings, like reference numbers are used to indicate like parts throughout the various views. Differences between like parts may cause those parts to be indicated by different reference numbers. Unlike parts are indicated by different reference numbers.

DETAILED DESCRIPTION OF THE INVENTION

Figure 1:
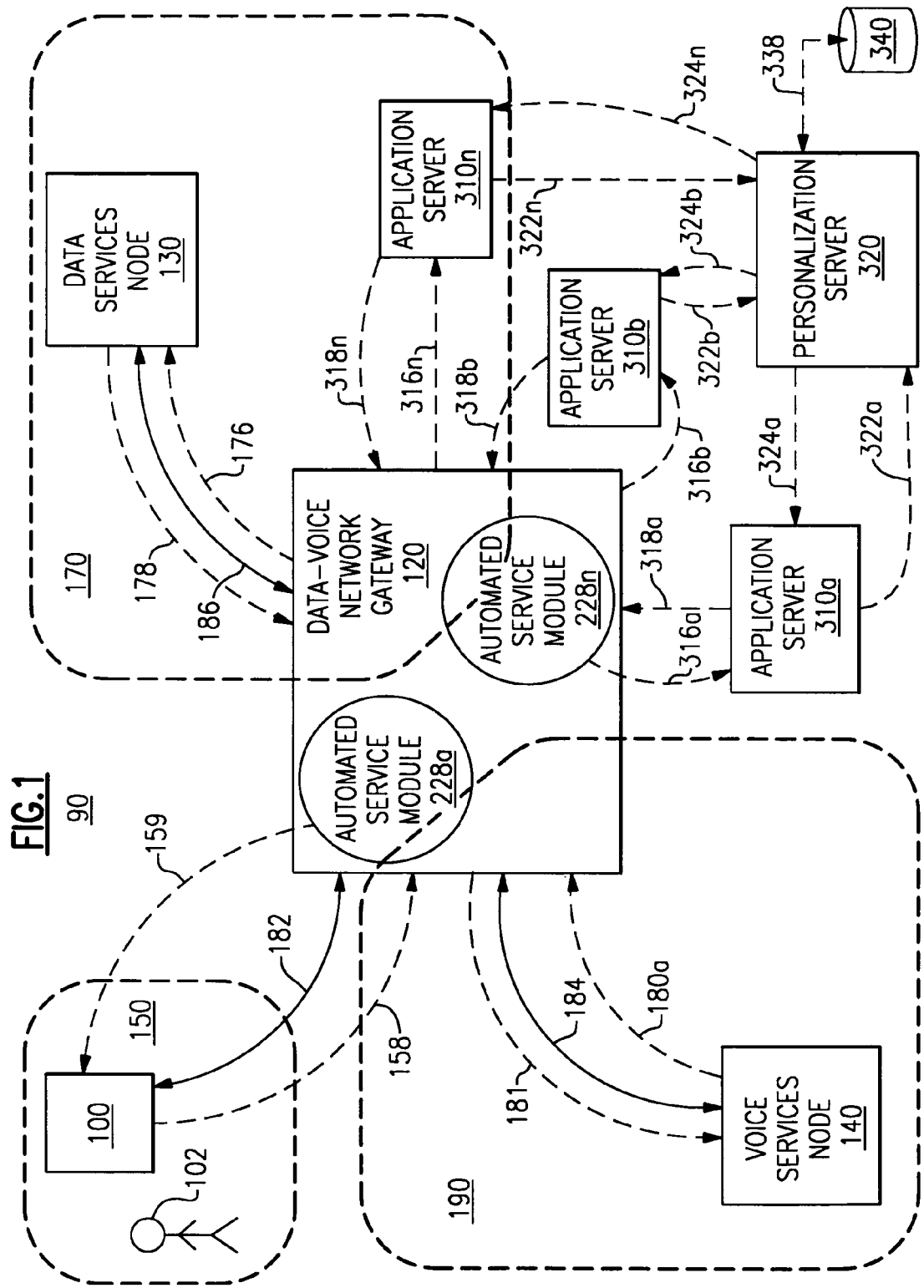
FIG. 1 is a block diagram illustrating an embodiment a system for personalizing voice and data based services to users of voice and data enabled communication devices.

FIG. 1 is a block diagram illustrating an embodiment a system 90 for personalizing voice and data based services to users 102 of voice and data enabled communication devices 100. The system of the invention inputs multiple types of request communications, encoded as voice or data, and outputs multiple types of response communications, encoded as voice or data, to a user 102 of a communications device 100. The device 100 is enabled with respect to communication of voice and/or data.

As shown, the device 100 resides within a wireless or wire line communications network 150. For this embodiment, the wireless or wire line communications network 150 is a wireless public land mobile network (PLMN) 150. In one use case scenario, the user 102 can establish an audio/voice type of interactive session with the system of the invention 90. An audio/voice type of session between the user 102 and the system 90 can include such as a voice dialog between the user 102 and an interactive voice response system or a voice dialog between a user 102 and a human operator.

In one use case scenario, the user 102 of the device 100 initiates a voice call 158 to an automated voice response type of service that is accessible via the data-voice network gateway 120 which is accessible via a voice network 190. The user 102 initiates the voice call 158 by dialing a telephone number associated with the automated voice response type of service. The voice call 158 is routed through the voice network 190 to a port provided by and accessible within the data voice gateway 120.

As shown, in this use case scenario, the voice call 158 is routed from the device 100 that is located (accessible) within the wireless or wire line network 150 to the data-voice network gateway 120 that is located (accessible) within the voice network 190. The voice call 158 can be routed via any voice compliant communications path from the device 100 to the data-voice network gateway 120.

The destination of the voice call 158, identified (addressed) by the telephone number, is a port number that is typically implemented as a combination of hardware and software within the data-voice gateway 120. The data-voice gateway 120 includes hardware and software that is configured and integrated to support the execution of a plurality of automated voice response types of applications. Each automated voice response type of application, is typically implemented at least partially as software, and is configured to process voice calls that are addressed to a telephone number that maps to at least one individual port number of the data-voice gateway 120. Hence, an automated voice response type of application is associated with at least one port within the data-voice gateway 120, and the at least one port is associated with at least one telephone number addressing the at least one port within the data voice gateway 120.

In one type of embodiment, an automated voice response type of application includes an automated service module 228a-228n (Also see FIG. 2), which is also referred to as an application service module 228a-228n. An instance of the particular automated service module 228a-228n is created to respond to and process the initiated voice call 158 and to direct an interactive session with the requester (caller) initiating the voice call 158.

Each instance of an automated service module 228a-228n executes and operates to provide an interactive voice session with an associated requester (caller) 102. While operating to provide an interactive voice session with a requester (caller) 102, each automated service module is configured to communicate with and to exchange information with at least one application server 310a-310n.

In one type of embodiment, an automated service module (ASM) 228a-228n includes at least one instance of a VXML interpreter 330b that is spawned from an ASM controlling module 330a (See FIG. 2), while operating to provide an interactive session with a requester (caller) 102. Optionally, in some embodiments, the ASM controlling module 330a is a CCXML interpreter 330a.

During its initial operation, the automated service module 228a-228n transmits a communication 316a-316n that requests a first portion of VXML script and optionally CCXML script, hereafter referred to as VXML/CCXML script, of a particular application and from a particular application server 310a-310n. In response, the application server 310a-310n transmits a communication 318a-318n including the requested first portion of VXML/CCXML script to the ASM 228. The ASM 228 receives and processes the VXML/CCXML script included within the communication 318a-318n.

Each of the application servers 310a-310n can be separately or collaboratively designed, implemented and provided by various third party application providers. The application servers 310a-310n may be located within separate facilities or collectively located within the same facility, near or far away from the data-voice gateway 120. Preferably, the application servers 310a-310n provide a communications interface to the automated service modules 228a-228n based upon the internet protocol (IP) and are accessible via the Internet, intranet or extranet. Other embodiments of various communication interfaces, protocols and topologies can be employed.

Each automated service module 228a-228n includes digital logic typically implemented as compiled and/or interpreted software. The digital logic typically includes a plurality of paths of control that constitute a program. The behavior of each ASM 228a-228n is directed via the execution of its digital logic via one or more of its paths of control.

While operating, the ASM 228a-228n inputs and processes the first portion of VXML script and optionally CCXML script (VXML/CCXML script). The first portion of VXML/CCXML script is processed (interpreted) by the ASM 228a-228n to direct an interactive session between the ASM 228a-228n and a requester (caller) 102. Execution of the first portion of VXML/CCXML. script can direct the ASM 228a-228n to communicate a request for in order to process other portions of VXML/CCXML script.

During its operation, the automated service module (ASM) 228 transmits one or more communications 316a-316n to at least one application server 310a-310n. Each communication 316a-316n includes information that identifies of portions of VXML/CCXML script as requested by the ASM 228a-228n. Each communication 316a-316n is received and processed by the at least one application server 310a-310n as a prerequisite to transmitting a response communication 318b, that may include VXML/CCXML script or other information used to assist with the direction of the operation of the ASM 228a-228n.

At least one communication 316a-316n that is transmitted from an automated service module 228 includes identifying information related to the identity of a requester (caller) 102. The identifying information may be source information associated with the voice call 158 or identifying information derived from the source information. Here, the ASM 228 functions as an embodiment of a requester identifying apparatus.

In one type of embodiment, the identifying information includes an automatic number identifier (ANI) which represents the telephone number of the device 100 being used by the caller 102. In this type of embodiment, the ANI is communicated by an automated service module 228 to an application server 310a-310n via at least one communication 316a-316n.

The application server 310a-310n transmits a communication 322a-322n to a personalization server 320, also referred to as a line interface memory module (LIMM) server 320 or personalization module 320. At least one communication 322a-322n includes the user (requester) identifying information that is employed by the personalization server 320 to access information potentially associated with the requester (caller) 102.

The personalization server 320 performs a search 338 of a data repository 340 that includes preference information that describes preferences that are associated with a population of users (requesters) associated with a particular application implemented by the ASM 228a-228n and/or provided by the system 90 across one or more applications. The personalization server 320 employs the user identifying information as search criteria for searching the data repository 340 for any associated preference information. In some embodiments, the search 338 is performed using a JDBC data repository interface.

In response, the personalization server 320 transmits a communication 324a-324n back to the application server 310a-310n including any preference information that is associated with the user identifying information that was found from the search of the data repository 340.

In one type of embodiment, the communications 322a-322n and 324a-324n employ the simple object access protocol (SOAP). The SOAP protocol is designed to promote cross-platform integration of software that may originate from different third party software developers. The system 90 is designed to accommodate third party software development. A third party can provide software for one or more of the application servers 310a-310n that interface with the data-voice network gateway 120 and the personalization server 320 according to known and predictable programming interfaces.

The application server 310a-310n receives the communication 324a-324n and generates VXML/CCXML script conditioned upon the specific preference information included within the communication 324a-324n and transmits the communication 318a-318n including the VXML/CCXML script to the ASM 228a-228n. In some circumstances, the VXML/

CCXML script includes tags that can reference one or more uniform resource locators (URL's) which reference (address) locations of stored pre-synthesized voice, WAV files or generated digitized voice. The generated digitized voice can be generated from a text to speech module.

In another use case scenario, a requester (user) 102 transmits an SMS data communication (not shown) to the data services node 130 to request a particular service. In response, the data services node 130 transmits a communication 178 via communications channel 186 to the data-voice gateway 120. The communication 178 includes information addressing a particular port within the data-voice gateway 120 like that described for the telephone number of the voice call 158.

In response, the data-voice gateway 120 initiates a voice call 159 to the requester (user) 102 establishing a voice session between an application and the requester 102. The voice session established by voice call 159 creates the same type of voice session that was established by voice call 158, as was described earlier.

In another use case scenario, a requester (user) 102 transmits a voice communication (not shown) to request a service from an operator residing within the voice services node 140. In response, as a result of an operator action, the voice services node 140 transmits a communication 180a via communications channel 184 to data-voice gateway 120. The communication 180a includes information addressing a particular port within the data-voice gateway 120 like that described for the telephone number of the voice call 158.

In response, the data-voice gateway 120 initiates a voice call 159 to the requester (user) 102 establishing a voice session between an application and the requester 102. The voice session established by voice call 159 creates the same type of voice session that was established by voice call 158, as was described earlier.

Figure 2:
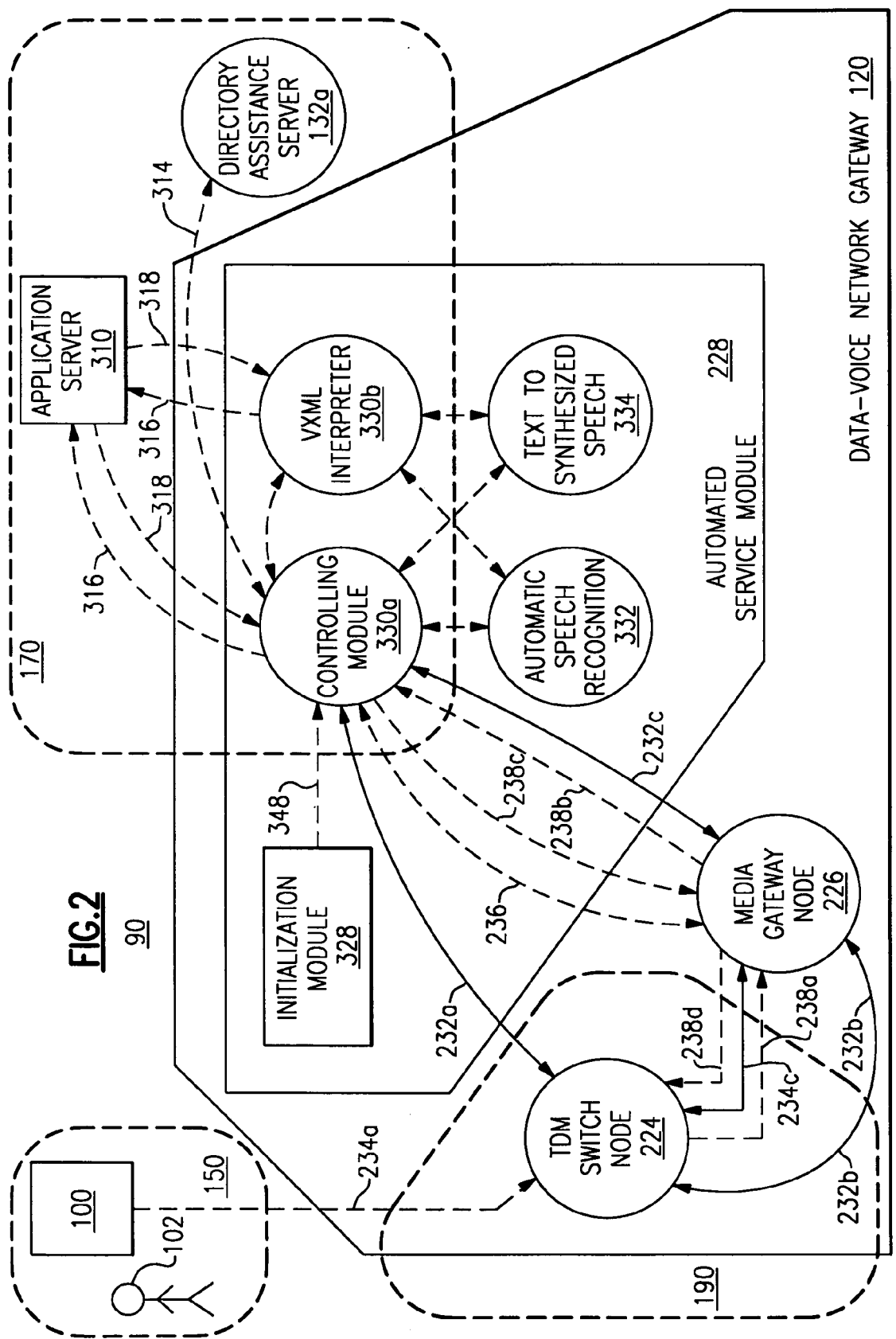
FIG. 2 is a block diagram illustrating some of the internal components of an embodiment of an automated service module that is configured to interface with a circuit switched voice network and a packet switched data network.

FIG. 2 is a block diagram illustrating some of the internal components of an embodiment of an automated service module 228 that is configured to interface with a circuit switched voice network 190 and a packet switched data network 170. The internal components are typically implemented as a combination of hardware and software. In this type of embodiment, an instance of an automated service module (ASM) 228 is employed to implement an automated interactive voice response interface with a user 102. As described earlier, the ASM 228 is associated with a particular application and at least one particular application server 310 that is associated with at least one port of the data-voice gateway 120.

As shown, the automated service module (ASM) 228 includes an ASM controlling module 330a and a voice XML (VXML) interpreter module 330b, an automatic speech recognition module 332 and a text to synthesized speech module 334. Optionally, the ASM controlling module 330a also functions as a call control XML (CCXML) interpreter module 330a. The media gateway node 226 receives a circuit switched analog or digital audio/voice communication 238a from requester 102 that travels through the TDM switch node 224 and through the circuit switched communications channel 234c, also referred to as a call leg 234c. In other embodiments, the communication 238a travels through communication channel 232b.

The media gateway 226 translates the circuit switched analog or digital audio/voice communication 238a to a packetized digital audio/voice communication 238b that is transmitted to the automated service module 228 via the communications channel 232c. The automated service module 228 receives and processes the packetized digital audio/voice communication 238b from the media gateway node 226 via the communications channel 232c. The audio/voice communication 238b packetizes and digitally encodes voice and/or touch tones communicated from the requester 102.

The automated service module 228 also transmits a packetized digital audio/voice communication 238c to the media gateway node 226, via the communications channel 232c. The audio/voice communication 238c digitally encodes voice and/or other types of audio. The media gateway 226 translates the packetized digital audio/voice communication 238c to an circuit switched audio/voice communication 238d that is transmitted through the TDM switch 224 via the circuit switched communications channel 234c. In other embodiments, the communication 238a travels through communication channel 232b. The requester 102 receives the circuit switched audio/voice communication 238d transmitted from the media gateway node 226 and traveling through the TDM switch 224 via the communications channel 234c.

As shown in this embodiment, digital packetized audio/voice communications are input into and output from the ASM 228 via the ASM controlling module 330a. Optionally, the ASM controlling module 330a is a CCXML interpreter module that inputs and processes CCXML script that is communicated from an application server 310. Typically, the CCXML script is associated with a particular application and is stored inside of one or more files accessible to the application server 310.

The ASM controlling module 330a spawns (creates) instances of the VXML interpreter module 330b. The VXML interpreter module 330b is a software module that inputs and processes VXML script that is communicated from an application server 310. Typically, the VXML script is associated with a particular application and is stored inside of one or more files accessible to the application server 310.

The ASM controlling module 330a and the VXML interpreter module 330b invoke, communicate and interoperate with the automated speech recognition module 332 to interpret the packetized digital audio/voice data received from a requester (user) 102 via the media gateway 226. The ASM controlling module 330a and the VXML interpreter module 330b invoke, communicate and interoperate with the text to speech module 334 to transmit packetized digital voice response communications to a requester (user) 102 via the media gateway 226 and the TDM switch 224.

In other embodiments, the requester 102 can communicate with the ASM 228 over a communications path that excludes the TDM switch 224 and the media gateway 226. For example, the requester 102 can communicate over a VoIP packet switched network (not shown) that communicates with the ASM 228. In this type of embodiment, packetized voice is communicated between the requester 102 and the ASM 228 over a communications path that does not require and that excludes the TDM switch 224 and the media gateway 226.

As shown, the automated service module (ASM) 228 includes an initialization module 328 which executes upon the creation (invocation) of an instance of an ASM 228. The initialization module 328 performs initialization functions of the ASM 228. The initialization module 328 creates (invokes) 348 an instance of a ASM controlling module 330a which optionally accesses initial CCXML script from the particular application server 310a-310n via transmission of communication 316a-316n and reception of communication 318a-318n.

The ASM controlling module 330a creates (invokes) one or more instances of a voice XML (VXML) interpreter 330b on demand, to process (interpret) VXML script accessed from the application server 310a-310n. The ASM controlling module 330a and the VXML interpreter 330b transmits one or more communications 316a-316n and receives one or more communications 318a-318n as a result of performing actions that are directed via processing (interpreting) of prior received CCXML or VXML script, respectively.

Preferably, the communications 316a-316n and 318a-318n employ the hypertext transport protocol (HTTP). The HTTP protocol is commonly used to transport Web pages over the Internet and supports interoperability between network nodes. Preferably, the HTTP protocol layer is carried by the TCP/IP protocol layers.

While executing, the ASM 228 via the CCXML 330a and the VXML 330b interpreter module may exchange communications 314 with other service nodes, for example, a directory assistance server 132a, to store and/or retrieve information to assist the performance of a interactive dialog between the automated service module 228 and the user 102. For example, a directory assistance request received from the user 102 in the form of packetized digital voice via the communications channel 232c can be translated into text by the automatic speech recognition module 332 and transmitted to the directory assistance server 132a by the CCXML 330a and/or the VXML 330b interpreter.

In response, the directory assistance server 132a transmits directory assistance information in the form of text to the CCXML 330a and/or the VXML 330b interpreter 330. The text to speech module 334 translates the text into digitized voice before it is communicated to the user 102 by the ASM controlling module 330a and/or VXML 330b interpreter module.

A flow of packetized digital audio, such as communicated through the communication channel 232c, is also referred to as an audio stream. The flow of circuit switched voice audio, represented by analog or digital signals, travels through circuit switched audio call legs 234a, In other embodiments, the communication 238a travels through communication channel 232b and call leg 234a. The flow of packetized digital audio that is communicated using the IP protocol, such as communicated by the communication channel 232c, is also referred to as an IP call leg 232c. An IP call leg 232c functions like an audio call legs 234a-234c to communicate audio between two locations. But unlike an audio call leg 234a-234c, an IP call leg 232c can be further controlled (manipulated) by digital logic, such as by one or more software modules.

The media gateway 226 interfaces, communicates and controls a TDM switch 224 via the data communications channel 232b. The media gateway node 226 translates voice received from the user 102 via the TDM switch 224 into packetized digital voice and communicates the digital voice to the automated service module 228 via the communications channel 232c. The media gateway 226 translates the packetized digital voice received from the ASM 228 into audio voice and communicates the audio voice to the user 102 via the TDM switch 224. The digital voice may have been previously translated from recorded digitized voice or translated from text into digitized voice via a text to synthesized speech module 334.

The communications channels 232b, 232c are preferably configured for the transmission of Internet Protocol (IP) and UDP data communications protocols. The communications channel 232b is preferably a dedicated channel, such as a hard wired connection.

The TDM switch node 224 is configured to provide circuit switching between telephone lines. A "telephone line" is a channel (path) of telephony communication between two entities, such as between two people or between a person 102 and an automated interactive voice application.

The TDM switch node 224 performs a telephony (circuit) connection between a first person and a second person by connecting a first telephone line associated with a first telephone that is used by a first person to a second telephone line associated with a second telephone that is used by a second person. Likewise, for example, the TDM switch node 224 can connect the first telephone line to a third telephone line associated with an interactive voice response system. The aforementioned "telephone lines" are also be referred to as "call legs".

The TDM switch node 224 is configured to be controlled via the communication of commands, also referred to as request communications that are received via its communications interface. The TDM switch node 224 receives request communications from the controlling module 330a of the ASM 228 via the communications channel 232a, and performs actions where appropriate in response to each received request communication, and transmits a response communication to the controlling module 330a via the communications channel 232a where appropriate.

In other embodiments, a gateway controller node (not shown) residing within the data voice gateway 120 spawns an instance of the ASM 228 and communicates with and controls the TDM switch 224 via the communications channel 232a and communicates with and controls the media gateway 226 via the communications channel 232c.

In the embodiment as shown, the controlling module 330a of the ASM 228 functions like the gateway controller node (not shown) and communicates with and controls the TDM switch 224 via the communications channel 232a and communicates with and controls the media gateway 226 via the communications channel 232c.

In one type embodiment, the automated service module 228 accesses a value of an automatic number identifier (ANI) of the device 100 via a programming interface 236 of the media gateway 226. In other embodiments, the ANI can be accessed from the TDM switch 224 via the communications channel 232a. The ANI identifies the telephone number of the device 100 and constitutes source information used to identify preferences associated with a user. Preferably, the initialization module 328 accesses the ANI before any CCXML or VXML script is accessed from an application server 310.

The media gateway 226 is configured to determine the ANI of an incoming voice call 158 and to provide access to the ANI via a media gateway programming interface 236 that is available to be exercised by other hardware and/or software components, including components within the automated service module 228. In other embodiments, the ANI can be accessed from the TDM switch 224 via the communications channel 232a. The automated service module 228 accesses and includes the value of the ANI within the communication 316 to the personalization server 320.

In one type of embodiment, the personalization server 320 utilizes the ANI value as a data repository search parameter (key) to retrieve preference information associated with the user 102. In this type of embodiment, preference information associated with a user 102 is stored and organized within the data repository 340 and indexed by at least an ANI value associated with a telephone number of a device 100 in the possession of the user 102.

In another type of embodiment, the personalization server 320 maps the ANI value to a user identifier and then utilizes the user identifier as a data repository search parameter (key) to retrieve preference information associated with the user identifier of the requester (caller) 102. In this type of embodiment, preference information associated with the user identifier of the requester (caller) 102 is stored and organized within the data repository 340 and indexed by at least a user identifier that is associated with possession of a device 100 having a telephone number equal to the ANI value.

At some point in time, the dialog between the user 102 and the automated system 228 will terminate as a result of an action by the user 102 and/or by the automated system 228. Optionally, the automated system may transfer interaction with a user 102 to another automated service or to a human operator.

In other embodiments, a circuit switched analog or digital audio/voice signal received via the TDM switch 224 is input into an embodiment of automatic speech recognition module (not shown) without traveling through a media gateway node 226. In this type of embodiment, the automatic speech recognition module is configured to map the analog or digital circuit switched voice signal to digitally encoded information. Preferably, the digitally encoded information is text. In some embodiments, the digitally encoded information represents the result of matching sounds (phonyms) encoded by the voice signal to one or more sounds within a sound (phonym) data repository.

Figure 3:
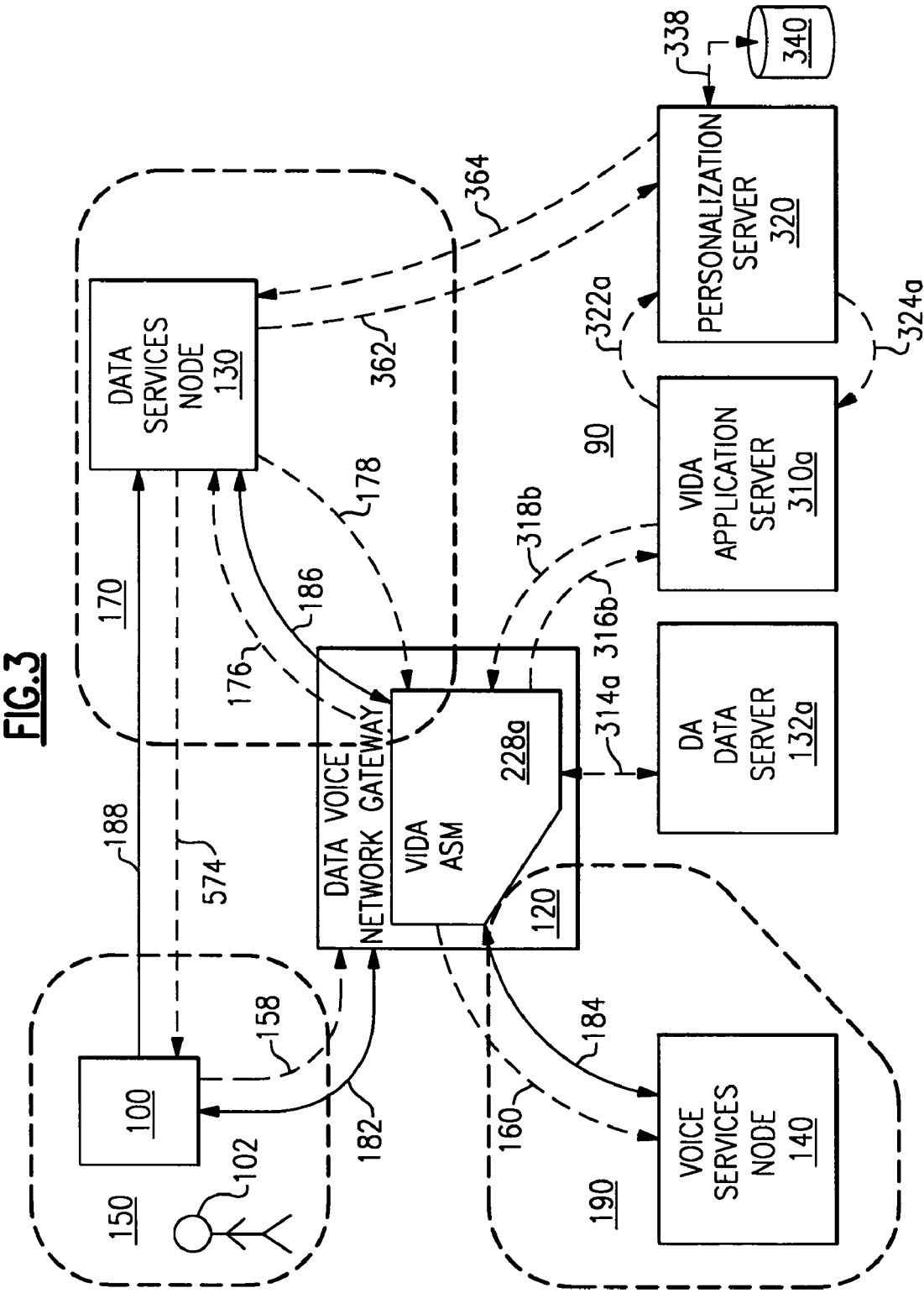
FIG. 3 is a block diagram illustrating the operation of a voice initiated directory assistance application that provides a directory assistance service to a user of the system.

FIG. 3 is a block diagram illustrating the operation of a voice initiated directory assistance (VIDA) application that provides a directory assistance service to a requester (user) 102 of the system 90. In one scenario, the user 102 of the device 100 initiates a voice call 158 to the voice initiated directory assistance (VIDA) service via a communications path 182. The communications path 182 passes through the wireless or wire line communications network 150 and the voice network 190 to an associated port number implemented within the data-voice network gateway 120. The user 102 initiates the voice call 158 by dialing a telephone number associated with the port number of the voice initiated directory assistance service of the data-voice gateway 120, as described for FIG. 1.

In this embodiment, the voice initiated directory assistance (VIDA) service application includes an associated automated service module (ASM) 228a (Generally described in FIG. 2). An instance of the voice initiated directory assistance automated service module 228a is spawned to respond to and process the incoming voice call 158.

The instance of the VIDA ASM 228a executes and operates to provide an interactive voice session between the associated requester 102 and the VIDA application. The automated service module 228a includes an ASM controlling module 330a and a VXML interpreter 330b (See FIG. 2).

During its initial operation, the automated service module 228a executes initialization code 328 which interfaces with the media gateway node 226 to obtain source information associated with the requester 102 of the service. In one type of embodiment, the initialization code transmits a communication via programming interface 236 to the media gateway node 226 that requests for a automatic number identification (ANI) value associated with the requester (voice caller) 102. In response, the media gateway node 226 determines the requested ANI value and transmits a communication via programming interface 236 that includes the requested ANI value, associated with the requester 102, to the initialization code 328. The described method to access the ANI value is an embodiment of a requester identifying apparatus. In other embodiments, the ANI can be accessed from the TDM switch 224 via the communications channel 232a.

Preferably, the initialization code 328 and the media gateway node 226 communicate using an IP based protocol stack. In other embodiments, the initialization code 328 and the media gateway can communicate and store an ANI value using a memory or device register location that is accessible to both the initialization code 328 and the media gateway 226.

The initialization code 328 of the automated service module 228a transmits a communication 316a to the voice initiated directory assistance application server (VIDAAS) 310a. The communication 316a requests delivery of a first portion of VXML/CCXML script associated with the voice initiated directory assistance application. The communication 316a includes the source information associated with the requester 102, which in this circumstance is equal to the ANI value associated with the voice call 158 obtained via the media gateway 226.

Prior to responding to the communication 316a, the application server 310a transmits a communication 322a to the personalization server 320. In this circumstance, the communication 322a includes the ANI value as the source information associated with the requester 102. In other circumstances, the source information may be an SMS protocol source address.

The personalization 320 server employs the ANI value as a parameter for searching a data repository 340 that includes preference information associated with users of the voice initiated directory assistance service. The data repository 340 also includes source information of various types and a user identifier associated with users of the system 90.

In some embodiments, the source information (ANI value) is mapped to a user identifier which is employed as at least a portion of the search criteria for searching the data repository 340 for preference information associated with the source information and/or the user identifier. The data repository 340 can be used to map one type of source information to another type of source information and/or to a user identifier, or used to map a user identifier to one or types of source information or preference information.

Upon finding preference information satisfying the search criteria, the personalization server 320 transmits a communication 324a to the voice initiated directory assistance application server 310a that includes the found preference information. The application server 310a processes the preference information in order to generate the first portion of VXML/CCXML requested by the communication 316a.

The preference information includes one or more individual preferences that are each named and that apply to the operation of one or more applications provided by the system 90. Some individual preferences apply to none or only one application, while other name preferences apply to many or all applications provided by the system 90. The application server 310a extracts the preference information of individual preferences that apply to the voice initiated directory assistance application (VIDAA).

In one type of embodiment, the VIDA application server 310a extracts a language, a custom prompt, an automation level, a delivery options, a personal address book update, a data protocol option, enhanced content (last used or frequently accessed) and a personalization information update method preference. Preferably, each individual preference is identified by a unique name that is represented by a textual string. Each named preference is associated with one or more preference values which are each also identified by a textual string.

The language preference indicates the speaking language, such as the English or Spanish speaking language, that is employed by the voice initiated directory assistance application, to generate and communicate synthesized voice to the requester 102 and to interpret, via speech to text recognition software, any voice communicated from the requester 102. As a result of a specified language preference, the application server 310a generates VXML that encodes voice messages that are articulated in the selected speaking language. By default, English is typically specified as the preferred language.

For example, the application server 310a supplies an initial synthesized voice message that is encoded into VXML. If a language preference of English is specified, the initial synthesized voice message recites "Hello". If a language preference of Spanish is specified, the initial synthesized voice message recites "Hola".

The custom prompt preference indicates the audio qualities of a voice employed by the voice initiated directory assistance application to generate and communicate synthesized voice to the requester 102. The audio qualities can include various sample voice characteristics, including that of a man or a woman. The custom prompt can also indicate the types of messages (a sequence of words) that are delivered (vocalized) to the requester 102 during a session.

The application server 310a supplies VXML encoded voice messages according to one or more preferences, including the custom prompt preference, of the requester (user) 102. The text to synthesized speech module 334 translates the VXML encoded messages according to any voice attribute preferences selected in association with the requester 102. Typically, a custom prompt preference is specified by default.

In some embodiments, the selection of a custom prompt message is based upon behavioral analysis of the requester (user) 102 by the system 90 over time. A custom prompt message may be a promotional message regarding a product or a service. The product or service may be selected based upon one or more products or services previously purchased by the requester 102. For example, the promotional message may advertise a product or service other than and/or related to a product or service previously purchased by the requester (user) 102.

The VIDA application server 310a responds to the communication 316a by transmitting a communication 318a to the VIDA automated service module 228a, that includes CCXML and VXML script that includes one or more voice messages that satisfy the language and the custom prompt preferences, and possibly other preferences of the requester 102. The CCXML also includes flow of control direction that satisfy the automation level, delivery options, PAB update preferences of the requester 102, further described below.

The automation level preference defines the behavior of the VIDA application. In one type of embodiment, the automation level preference can be associated with 3 possible values, namely "high", "medium" and "none".

When the automation level preference is set equal to "none", a voice initiated request 158 for directory assistance from a requester 102 is immediately transferred by the VIDA automated service module 228a to a live human operator. In this type of scenario, the VIDA application server 310a supplies a VXML voice message within the communication 318a reciting to the requester 102 in effect that "You are being transferred to an operator", using the English or Spanish speaking language for example, according to the preferences of the requester 102. The communication also includes flow of control direction within the CCXML script to perform actions to transfer the requester to an operator.

Accordingly, the VIDA automated service module, via execution of the CCXML script of the communication 318a, performs actions to select an operator and to join (connect) a call leg of the voice call 158 with a call leg associated with the selected operator. The actions include transmitting commands to the TDM switch 224 to connect the requester 102 to the selected operator.

Typically, the selected operator is an available operator that associated with a voice service node 140. In some circumstances, requester 102 may be placed on hold while waiting to be connected to the selected operator. Optionally, the application server 310a also performs actions so that background music is communicated to the requester 102 while the requester 102 is waiting to be connected to the selected operator.

When the automation level is set equal to "medium" a voice initiated request for directory assistance from a requester 102 is handled by the VIDA application in the following manner. In this scenario, the application server 310a supplies a voice message encoded into VXML script that states to the requester 102, "Please identify the city and state associated with your request". Notice that the application server 310a does not ask the requester 102 for a name associated with the directory listing request. The VIDA automated service module 228a processes the VXML/CCXML to transmit the voice message to the requester 102

In this scenario, the requester 102 responds by transmitting a voice communication that includes a vocalization of "Orlando" and "Florida". The voice communication is an circuit switched signal that travels from the device 100, through the TDM switch 224 and to the media gateway 226 and is translated into a digital (VoIP) representation by the media gateway 226 and buffered into memory for input to the ASM controlling module 330a.

Like the scenario described for when the automation level is set to "none", the application server 310a supplies synthesized voice message stating to the requester 102 that "You are being transferred to an operator". Accordingly, the automated service module 228a performs actions to select an operator and to join (connect) a call leg of the voice call 158 with a call leg associated with the selected operator via commands communicated to the TDM switch 224 via the media gateway 226.

Further, in this type of scenario, the ASM controlling module 330a transmits a communication 160 via a communications path 184 that includes the digital representation of the voice communication vocalized from the requester 102, also referred to as a "whisper" communication, to a memory queue of the selected operator. In some circumstances, actions of the ASM controlling module 330a are directed by CCXML/VXML script.

The communication path 184 passes through the data network 170 to the voice services node 140 where the selected operator resides. Upon connecting the requester 102 with the selected operator, the whisper communication is processed by a digital (VoIP) to speech synthesizing module and is vocalized to the selected operator in an automated fashion.

The operator engages the requester 102 in an interactive voice session via the voice network 190 and asks the requester 102 for the name of the listing. The operator searches for listings matching the city, state and name information vocalized by the requester and communicates any matching listing information to the requester 102. In this scenario, the VIDA service is partially automated in that the city and state information of the listing search criteria are collected in an automated manner.

When the automation level preference is set to "full", the voice initiated directory assistance application behaves like when it is set to "medium", except that the requester 102 is not transferred to an operator and no whisper communication is transmitted. Instead, the ASM controlling module 330a directs the speech recognition module 332 to translate the digital voice representation of the city and state information vocalized by the requester 102 into a text representation of the same information. The speech recognition module 332 inputs the digital voice representation and outputs the text "Orlando" and "Florida" which is input by the ASM controlling module 330a.

Next, the application server 310a also generates a VXML voice message stating to the requester 102, "Please identify the name associated with your request". Notice that the application server 310a has previously asked the requester 102 for the city and state associated with the directory listing request.

The requester responds 102 by transmitting a voice communication that includes a vocalization of "John Smith". Like for the city and state voice communication, the speech recognition module 332 inputs a digital representation and outputs the text "john" and "smith" which is input by the ASM controlling module 330a.

In this scenario, the ASM controlling module 330a requests a search of a listing data repository (not shown) via an exchange of communications 314 with a directory assistance server 132a. The ASM controlling module 330a transmits a text representation of the city, state and name information vocalized by the requester 102, to the directory assistance server 132a. The text representation is translated from speech by the automatic speech recognition module 332.

The directory assistance server 132a responds by transmitting a text representation of zero, one or more matching listings. One or more matching listings will be translated from text to a digital VoIP speech representation via a text to synthesized speech module 334, in accordance with preferences of the requester 102. The digital (VOIP) speech representation is translated by the media gateway 226 into an circuit switched voice communication that is transmitted via the TDM switch 224 to the device 100 in the possession of the requester 102.

By further interacting with the voice initiated directory assistance (VIDA) application, the requester 102 indicates a selection of a listing by vocal or touch tone audio communication transmitted to the CXML module 330a via the communications path 182. In response, the ASM controller 330a transmits a communication 168 that vocalizes the telephone number and/or address information associated with the selected listing, to the device 100 in the form of packetized digital voice. The media gateway 226 translates the packetized digital voice into circuit switched voice and communicates the circuit switched voice through the TDM switch 224 to the device 100.

The delivery options preference indicates what types of communications should be employed by the VIDA application to deliver the result of the service to the requester 102. The delivery options preference can indicate voice only, data only or voice and data delivery options. If the delivery options preference is set to data or voice and data, the ASM controlling module 330a transmits a communication 176 to the data services node 130 including the text of the selected listing and the user identifier associated with the requester 102.

Optionally, the data services node 130 transmits a communication 362 to the personalization server 320 including the user identifier to confirm and/or search for any other preference information associated with delivering the listing to the requester 102 via an SMS communication. The personalization server 320 performs a search 338 of the data repository 340 to map the user identifier to a SMS source address and transmits a communication 364 to the SMS service node 130 including the SMS source address of the requester 102. The data services node 130 transmits an SMS communication 574 that is addressed to the SMS source address of the device 100 via a data network 170 and the wireless or wire line network 150. The device 100 receives and queues the SMS communication 574 into its memory for later retrieval by the requester 102.

The personal address book (PAB) update preference indicates whether the listing, selected by the requester 102, should be added to a PAB associated with the requester 102. Various values of the PAB update preference can be set to either always store a selected listing, or to prompt the requester for approval to store a selected listing, or to conditionally store a selected listing based upon various rule based criteria, including for example, based upon area code, day of the week, time of the day, etc.

The data protocol options preference indicates the data communication protocol functionality that is enabled within the device 100 and the data communication protocol functionality that is selected by the requester 102 to be provided by the system 90. For example, preference values can indicate whether the device 100 supports the SMS, MMS and/or the WAP protocols. Further, functionality outside of support for specific data communication protocols, can be indicated. For example, accented text characters can be employed for a Spanish language application. The device 100 may or may not be enabled to support accented characters. Preference values can be set to enable or disable any system provided support for accented characters.

The personalization information update method preference indicates rules regarding how preference information is to be stored and revised. A "dynamic" value indicates that the user 102 prefers to interact with the system 90 via a voice session in order to set or revise system wide personal preference values. System wide personal preferences are collectively associated with various applications provided by the system 90. A "user initiated" value indicates that the user 102 prefers to interact with the system 90 via a network interface, such as an Internet Web site to set or revise system wide personal preference values.

A "batch" value indicates that the system 90 is permitted to update personal preferences for the user 102. The batch preferences are preferences that are associated with one or more groups of users of which the user 102 is a member. Any preferences that are updated for a group of users are also updated for each user 102 that is a member of that group of users.

An "emergency" value indicates that the system 90 is permitted to revise personal preferences to respond to emergencies, such as for example, a network outage. Preferences may be temporarily revised for the duration of an emergency and restored after termination of the emergency.

In some embodiments, the user can set a preference that invites/permits the system 90 to monitor and store information recording the user's actions while the user 102 is using the system 90 over a period of time. Periodically and preferably during hours of low activity, the system 90 executes a process that heuristically processes the information recorded over the period of time. The results of the heuristic processing can lead the system 90 to perform adjustments in the service provided to the user. For example, if the user 102 initiates most of his/her calls to the system on a Friday, the system can provide or offer to provide discounted calling services for calls initiated in Fridays.

The enhanced content preference indicates whether the system 90 can provide. unsolicited information and/or unsolicited prompts offering to provide information (services) based upon information previously accessed by or supplied to the user 102. For example, if the user previously accessed information regarding particular stock values, news of sports teams and/or scores or weather, unsolicited current information regarding the same subject matter can be provided or offered in an unsolicited manner.

In some embodiments, the enhanced content preference can further specify that the information previously accessed is information that was last accessed and/or frequently accessed by the user 102 over a period of time. In some embodiments, the VIDA application uses information that was last accessed and/or frequently accessed as a default, for identifying the information previously accessed. In some embodiments, the frequently accessed information is information that was most frequently accessed by the user 102 over a period of time.

In some embodiments, the subject matter can be offered as user selectable custom menu selection. The custom menu selection can be "customized" with respect to its content and with respect to its location among other available menu selections provided. A selection by the requester 102 of a custom menu selection can provide the requester 102 with an assortment of information previously accessed (requested) by the requester 102 from the system 90.

For example, the menu selection can provide one or more stock quotes, one or more scores associated with particular (favorite) teams associated with various particular (favorite) sports, news articles (stories) associated with particular (favorite) topics, etc.

The aforementioned description of the VIDA application provides examples of how personal preferences can influence the behavior a service provided by the system 90. The VXML/CCXML supplied by the VIDA application server 310a and processed within the VIDA automated service module 228, reflects the personal preferences of the requester 102.

Figure 4:
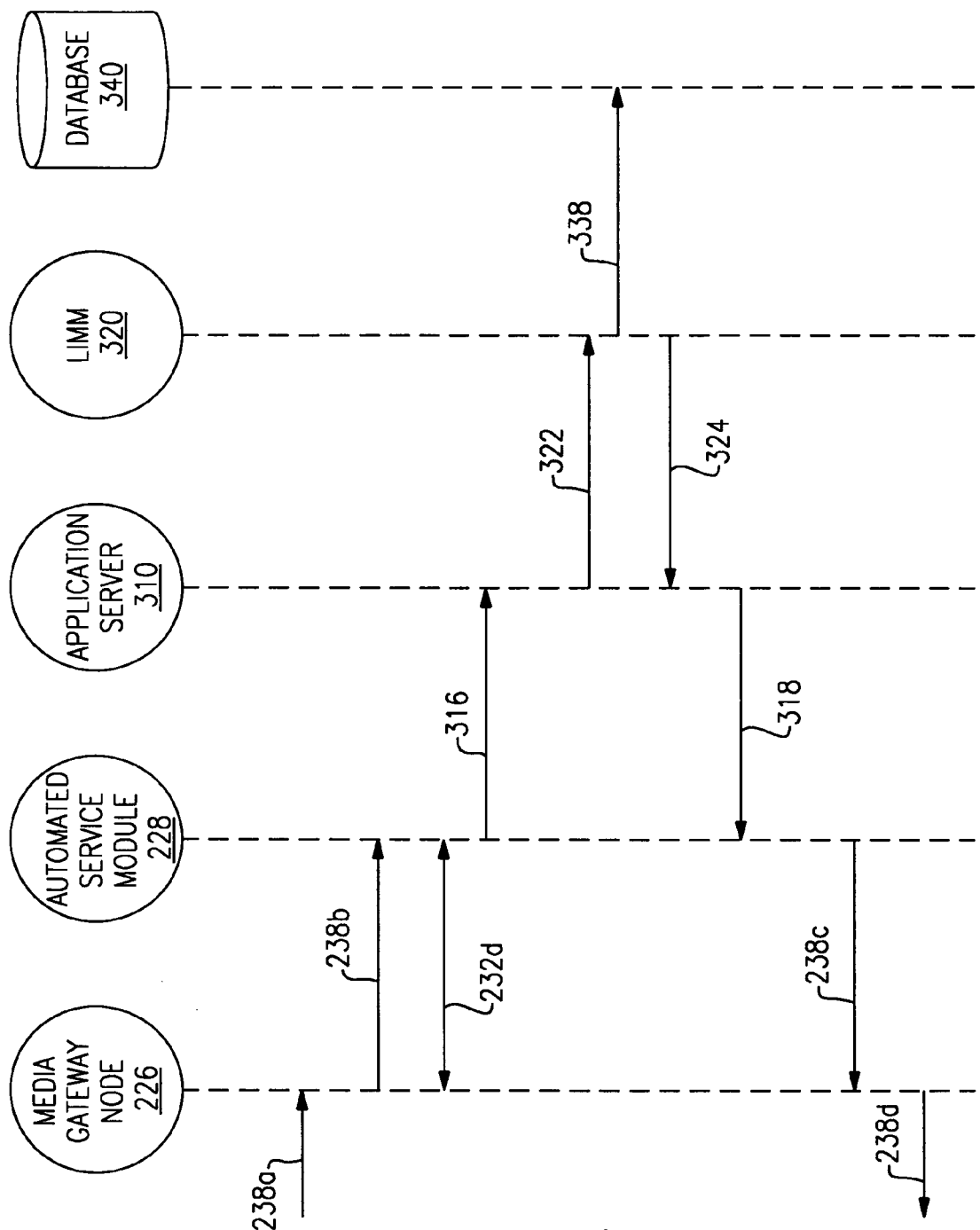
FIG. 4 is a block diagram illustrating a time sequence of communications associated with a generalized voice initiated application, like the application of FIG. 3.

FIG. 4 is a block diagram illustrating a time sequence of communications associated with a generalized voice initiated application, like the application of FIG. 3. As shown, the media gateway node 226 receives a circuit switched audio/voice communication 238a from a requester 102 that travels through the TDM switch node 224 and the circuit switched communications channel 234c. In other embodiments, the communication 238a travels through communication channel 232b. The media gateway 226 translates the circuit switched audio/voice communication 238a to a packetized digital audio/voice communication 238b that is transmitted to the automated service module 228 via the communications channel 232c. In some embodiments, a session interface protocol (SIP) INVITE message can be transmitted to the automated service module 228 to establish a SIP communications path 232c between the media gateway 226 and the automated service module 228.

The automated service module 228 transmits a communication 316 to an associated application server 310. The communication 316 requests delivery of a portion of VXML/CCXML script associated with the application. The communication 316 includes the source information associated with the requester (user) 102, which in this circumstance is equal to the ANI value associated with the voice call 158 obtained via the media gateway 226.

Prior to responding to the communication 316, the application server 310 transmits a communication 322 to the personalization server 320. In this circumstance, the communication 322 includes the ANI value as the source information associated with the requester 102. In other circumstances, the source information may be an SMS protocol source address, where applicable.

The personalization server 320 employs the ANI value as a search parameter for searching a data repository 340 that includes preference information associated with users 102 of the voice initiated directory assistance service. The data repository 340 can also include various types of source information and user identifiers associated with each of the users of the system 90.

In some embodiments, the source information (ANI value) is mapped to a user identifier which is employed by the personalization server 320 as at least a portion of the search criteria for searching the data repository 340 for preference information associated with the source information and/or the user identifier. Preferably, the data repository 340 can be used to map one type of source information to another type of source information and/or to a user identifier, or used to map a user identifier to one or types of source information or preference information.

Upon finding preference information satisfying the search criteria, the personalization server 320 transmits a communication 324 to a general voice initiated application server 310 that includes the found preference information. The application server 310 processes the preference information in order to dynamically generate, if necessary, the VXML/CCXML requested by the communication 316. Preferably, the communications 322 and 324 employ the simple object access protocol (SOAP) as previously explained (See FIG. 2).

The application server 310 responds to the communication 316 by transmitting a communication 318 to the automated service module 228 that includes the VXML/CCXML script that was generated based upon the preference information associated with the requester 102. The ASM 228 receives and processes the VXML/CCXML script included within the communication 318a-318n.

The automated service module 228 transmits a packetized digital audio/voice communication 238c to the media gateway node 226, via the communications channel 232c. The audio/voice communication 238c digitally encodes voice and/or other audio. The media gateway 226 translates the packetized digital audio/voice communication 238c to a circuit switched audio/voice communication 238d that is transmitted through the TDM switch 224 via the circuit switched communications channel 234c. In other embodiments, the communication 238a travels through communication channel 232b. The requester 102 receives the circuit switched audio/voice communication 238d from the media gateway node 226 that travels through the TDM switch 224 and the circuit switched communications channel 234c.

Figure 5:
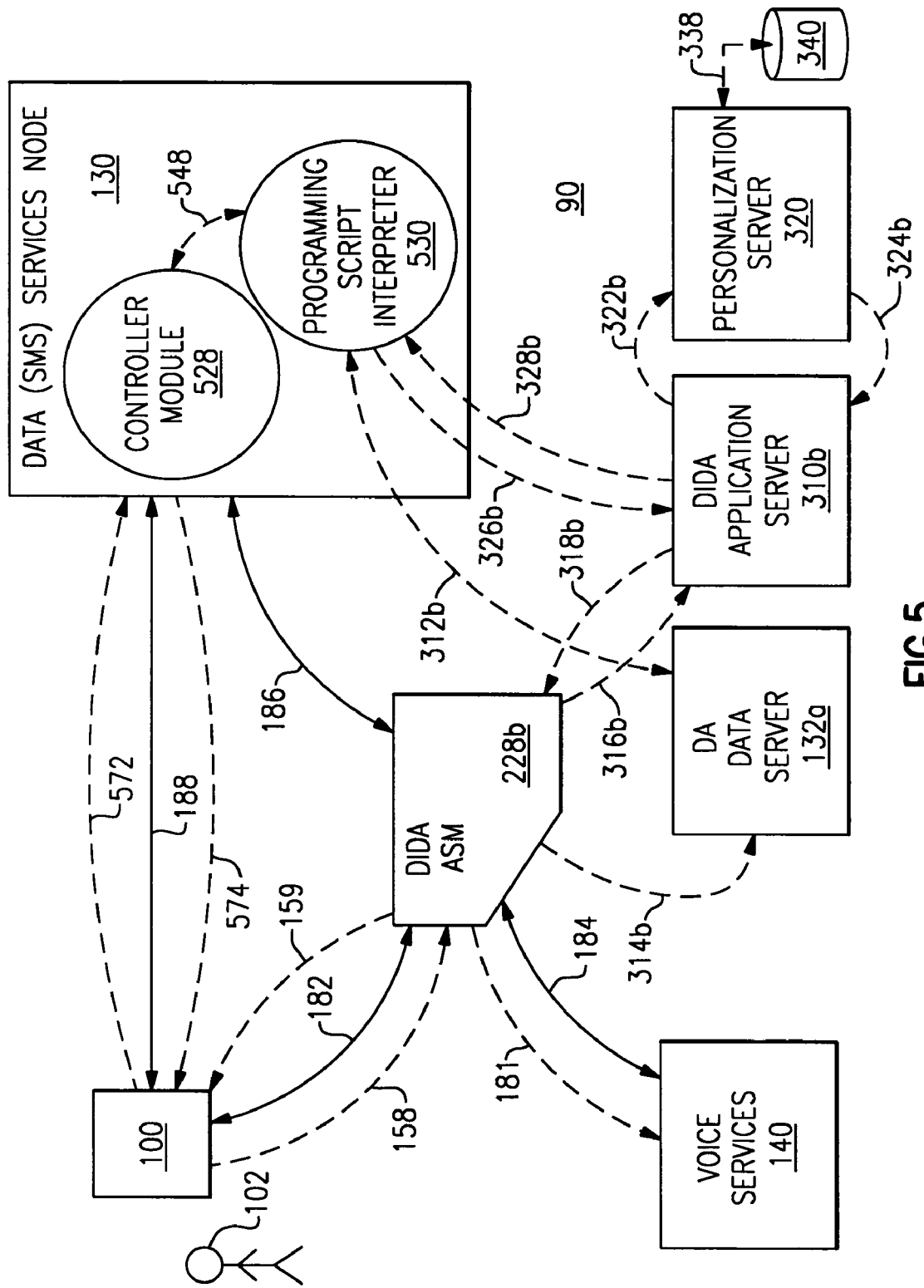
FIG. 5 is a block diagram illustrating the operation of an SMS protocol data initiated directory assistance (DIDA) application that provides a directory assistance service to a user of the system.

FIG. 5 is a block diagram illustrating the operation of an SMS protocol data initiated directory assistance (DIDA) application that provides a directory assistance service to a user 102 of the system 90. In one use case scenario, the user 102 of the device 100 transmits an SMS communication 572 to the SMS protocol data services node 130, also referred to as the SMS services node 130, via a communication channel 188. The communications path 188 passes through the wireless or wire line communications network 150 and the data network 170 to an associated SMS addressed port implemented within the SMS services node 130 (See FIG. 3).

In this embodiment, the SMS protocol (DIDA) service application includes a controller module 528 and a programming script interpreter 530. An instance of the programming script interpreter 530 is spawned 548 to respond to and process information carried by the incoming SMS communication 572.

The instance of the controller module 528 executes and operates to provide an interactive SMS protocol session between the associated requester 102 and the SMS protocol (DIDA) application. During its initial operation, the controller module 528 executes initialization code to obtain source information associated with the requester 102 of the service. In this type of embodiment, the source information is SMS protocol source address of the device 100. Preferably, the source information is an SMS protocol source address that is accessed from SMS protocol software executing within the SMS services node. The described method to access the SMS protocol source address is an embodiment of a requester identifying apparatus.

The programming script interpreter 530 transmits a communication 326b to an SMS protocol (DIDA) application server 310b. The communication 326b requests delivery of a portion of programming script associated with the SMS (DIDA) application. The communication 326b includes the source information associated with the requester 102, which is equal to the SMS protocol source address associated with the device 100.

Prior to responding to the communication 326b, the application server 310b transmits a communication 322b to the personalization server 320. In this circumstance, the communication 322b includes the source information associated with the requester 102.

The personalization server 320 employs the source information (SMS protocol source address) as a parameter for searching 338 a data repository 340 that includes preference information associated with users of the DIDA application service. The data repository 340 can also include various types of source information and user identifiers associated with each of the users 102 of the system 90.

In some embodiments, the source information (SMS protocol source address) is mapped to a user identifier which is employed as at least a portion of the search criteria for searching 338 the data repository 340 for preference information associated with the source information and/or the user identifier. The data repository 340 can be used to map one type of source information to another type of source information and/or to a user identifier, or used to map a user identifier to one or types of source information or preference information.

Upon finding preference information satisfying the search criteria, the personalization server 320 transmits a communication 324b to the SMS (DIDA) application server 310b that includes the found preference information. The SMS DIDA application server 310b processes the preference information in order to supply the portion of programming script requested by the communication 326b. The SMS DIDA application server 310b later responds to the communication 326b by transmitting a communication 328b to the programming script interpreter 530 that includes programming script having content that is determined from the preferences of the requester 102.

In one type of embodiment, the SMS DIDA application server 310b extracts the preference information associated with individual preferences that are processed by the SMS (DIDA) application. In one type of embodiment, the SMS DIDA application server 310b extracts a delivery option, a redirect option, a message format, an update method, an operator backing and an enhanced content preference. The delivery option, redirect option, message format, update method, and an enhanced content preferences influence the behavior the services provided by the SMS DIDA application in a manner like that previously described for the VIDA application (See FIGS. 3-4).

After processing the preferences of the requester 102, the SMS DIDA application server 310b responds to the communication 326b by transmitting a communication 328b to the programming script interpreter 530 of the SMS services node 130 that includes programming script content that is determined from the preferences of the requester 102. The programming script content includes text messages and flow of control directives and is determined from the aforementioned preferences associated with SMS protocol (DIDA) application.

For example, in one type of embodiment, the application server 310b supplies programming script content that includes directives to process SMS text messages, including SMS text messages that request directory assistance. In one type of use embodiment, the requester 102 of the device 100 transmits a request for directory assistance within a communication 572 that is addressed to the SMS data services node 130, having a known network protocol address. The request is represented by text data transmitted within the communications 572.

The SMS services node 130 receives the request within communication 572 and determines what actions are required to process it via execution of the programming script. Typically, a request for directory assistance includes name information for which telephone number and/or address information is sought by the requester (user) 102. The name information is at least a portion of a name of an entity. An entity can be of a person, a business or government agency, for example.

Via execution of the programming script, the SMS services node 130 exchanges communications via communication channel 316b to a directory assistance data server 132a to access telephone number and/or address information associated with the name information communicated from the user 102. If the telephone number and/or address information is not locally available to the directory assistance server 132a, the directory assistance server data 132a transmits a communication to one or more other content servers (not shown). The directory assistance server data 132a transmits a response communication, including matching directory assistance information, as part of the message exchange via communication channel 312b to the SMS services node 130.

The SMS data services node transmits a response communication 574 to the communications device 100 via the SMS relay node 110. The response communication includes telephone number and/or address information sought by the user 102. Typically, the SMS services node 130 transmits a response communication 574 including at least one item (listing) of telephone and/or address information associated with a name information of the original request communication 572.

In some circumstances, multiple items (listings) of telephone number and/or address information may potentially match the name information communicated from the requester 102. As a result, the response communication 574 includes multiple listings. The listings are received by the device 100 and displayed (formatted) by the device 100 for requester (user) 102 viewing and selection. An example of (2) such listings are shown as follows:

1 of 8
Domino's Pizza
461 Ponce De Leon Ave NE
Atlanta, Ga. 30308
404-874-0030
2 of 8
Domino's Pizza 3300 Buford Hwy
Atlanta, Ga. 30329
404-872-3000

As shown above, the first listing has an index identifier of "1" of 8 total listings and the second listing has an index identifier of "2" of 8 total listings. The user 102 can later use the index identifier to reference a particular listing using other request codes. A range of listings, identified by a corresponding range of indexes, can be communicated to the user 102 per SMS message communication 172a.

In some embodiments, reverse directory assistance services are provided. The user communicates telephone number information within the request communication 152a and the SMS services node 130 responds with name and/or address information associated with the telephone number information, if the telephone number is listed.

The user can communicate 152a various other request nodes to the SMS services node. These codes are listed as follows.

| | |
|---|---|
| N | Receive next listing if multiple listings are available; |
| P | Receive previous listing if multiple listings are available; |
| O | Request Operator backing; |
| L | Last Request; and |
| H | Send help information. |

Short codes are SMS addresses that are employed to identify and distinguish different SMS users and different SMS services. For example, a short code having a value equal to 411 can be assigned to identify a particular SMS based directory assistance service and a short code having a value equal to 2411 can be assigned to identify another SMS based service.

The behavior of the SMS DIDA application is also influenced by an operator backing preference. The operator backing preference indicates if, and under what circumstances a requester 102 should receive live operator assistance while using the services of the SMS DIDA application. The operator assistance preference can indicate that the requester 102 receives operator assistance after an occurrence of a predetermined number of failed attempts to access information using the DIDA application. Alternatively, the operator assistance preference can indicate that the requester 102 receives operator assistance upon demand via transmission of an SMS text message command from the user 102.

In one type of embodiment, upon occurrence of the predetermined number of failed attempts, the data services node 130 transmits a communication 178 via the communications channel 186 to the ASM 228b of the data-voice gateway 120. The communication 178 includes information requesting operator assistance and can optionally address a particular port within the data-voice gateway 120 that is associated with selecting the services of an available operator.

In response, the ASM 228b initiates a voice call 159 to the requester (user) 102 and initiates a voice call 181 to a selected operator in order to join the voice calls 159, 181 and to establish a voice session between the requester 102 and the selected operator. In some embodiments, the ASM 228b accesses the personalization server 320 to map an SMS address to a telephone number (not shown).

Typically, the selected operator is an available operator that associated with a voice service node 140 (See FIGS. 1, 3). In some circumstances, requester 102 may be placed on hold while waiting to be connected to the selected operator. Optionally, the application server 310b also performs actions so that background music is communicated to the requester 102 while the requester 102 is waiting to be connected to the selected operator. If the requester 102 terminates interaction with system 90 after being transferred, the prior directory assistance sessions are characterized as being data initiated and voice terminated.

By further interacting with the SMS DIDA application, the requester 102 indicates a selection of a listing by communicating a text identifier associated with the selected listing via another communication 572. In response, the programming script interpreter 530 transmits another communication 574 that includes the telephone number and/or address information associated with the selected listing, to the device 100 in the form of a communication 574 of SMS protocol encoded text.

The aforementioned description of the SMS DIDA application provides examples of how personal preferences can influence the behavior of a service provided by the system 90. The programming script supplied by the DIDA application server 310b and processed within the SMS protocol data services node 130, reflects the personal preferences of the requester 102.

Figure 6:
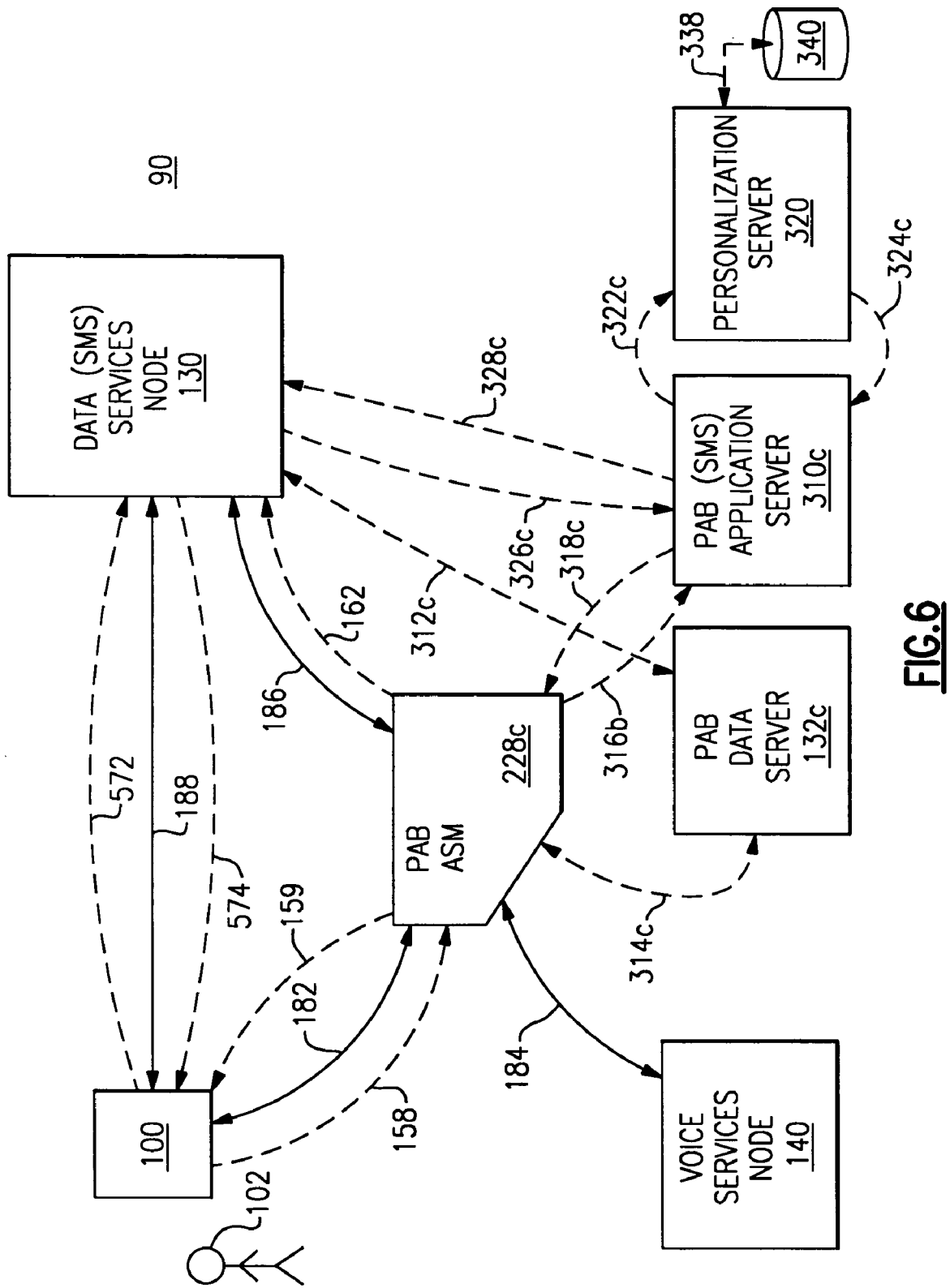
FIG. 6 is a block diagram illustrating the voice and data initiated operation of a personal address book (PAB) application that provides (contact) information and calendar related services to a user of the system.

FIG. 6 is a block diagram illustrating the voice and data initiated operation of a personal address book (PAB) application that provides (contact and availability) information and calendar related services to a requester (user) 102 of the system 90. The PAB application enables a user to store various types of information, typically contact information, associated with various entities. The various entities can include for example, individuals, organizations, business enterprises and government agencies. Contact information can include mailing address(es), telephone number(s) and email address(es) information.

Further, in some embodiments, the PAB application is configured to interoperate with an IMS (IP multi-media system) that provides "presence" information regarding the availability of an entity to immediately engage in a voice or data session with the requester 102. In some embodiments, IMS system tracks whether a cell phone of another entity is ON, or if another entity has indicated that he/she is available to the IMS system.

A requester 102 can interact with the PAB application via a voice initiated or a data initiated session. As shown, the voice initiated operation of the PAB application employs an associated automated service module (ASM) 228c that interacts with the requester 102 via a telephone number addressable port. (Generally described in FIG. 2). The data initiated operation of the PAB application employs the operation of the SMS data services node 130 (FIG. 5)

In one use case scenario, the requester (user) 102 of the device 100 initiates a voice call 158 to the PAB application and the PAB application responds to the voice call 158 in a manner like that described for the VIDA application (See FIG. 3). An instance of the PAB automated service module 228c executes and operates to provide an interactive voice session between the associated requester 102 and the PAB application. The automated service module 228c includes an instance of an ASM controlling module 330a and a VXML interpreter 330b (See FIG. 2).

As previously described, an instance of the ASM 228c (FIG. 2) executes and operates to provide an interactive voice session between the associated requester 102 and the PAB application and to obtain source information (ANI value) of the device 100.

The ASM 228c transmits a communication 316c to the PAB application server to request delivery of a portion of programming script associated with the PAB voice application. The communication 316c includes the source information associated with the requester 102, which is equal to the ANI associated with the device 100. The application server 310d exchanges communications 322c, 324c with the personalization server 320 and the personalization server 320 supplies preference information to the application server 310c, as described earlier (FIGS. 3, 6).

The PAB application server 310c processes the preference information in order to supply the portion of programming script, preferably VXML/CCXML, requested by the communication 316c and later responds by transmitting a communication 318c to the appropriate script (VXML/CCXML) interpreter within the PAB ASM 228c. The appropriate script includes content that is determined from the preferences of the requester 102. In some embodiments, the programming script is generated during run time. In other embodiments, the programming script is integrated from pre-existing portions of programming script.

The PAB ADM 228c exchanges communications with the PAB service node (data server) 132c to access PAB related information (data) to process a particular request of the user 102. Optionally, the user 102 can request to establish a data session with the PAB application, which is established as described below.

In one type of embodiment, the PAB application server 310c extracts the preference information associated with individual preferences that are processed by the PAB application. In one exemplary type of embodiment, the PAB application server 310c extracts a preferred language, a custom prompt, a delivery option, a message format, an update method, a validation interval and a calendar alert preference. The preferred language, custom prompt, delivery option, message format and update method preferences influence the behavior the services provided by the PAB application in a manner like that previously described for the VIDA application (FIG. 3).

The behavior of PAB application is also influenced by a validation interval preference and calendar alert preference. The validation interval preference indicates a time interval for validating telephone numbers stored within the PAB application via automated directory lookup. A batch program is periodically executed to directly assistance verify that telephone numbers stored within the PAB are still valid.

The calendar alert preference indicates a selected method for delivery of reminder communications to the requester (user) 102. A reminder communication can be delivered to the user 102 via a voice communication or a data communication. The reminder voice communication is delivered to the user 102 as a voice call 159 that transmits reminder information via synthesized speech. The reminder data communication is delivered as a text message via the communications 176, 574 (See FIG. 3) to the requester (user) 102 through the (SMS) data services node 130.

A reminder communication functions to remind the user of an appointment or functions as a wake up or an interruption call. An interruption call schedules a call from the PAB application at a time during an event where the requester (user) 102 may want to be interrupted for the purpose of making a decision based upon immediate circumstances. An extreme example is where the user is on a "blind date", an interruption call can be used as an opportunity for the user 102 to decide whether to continue to attend the date or to excuse him or her self from the blind date or other interrupted activity.

After processing the preferences of the requester 102, the PAB application server 310c responds to the communication 316c by transmitting a communication 318c to the automated service module 228c that includes programming script having content that is determined from the preferences of the requester 102. Preferably, the programming script content includes VXML/CCXML that is interpreted by a VXML and/or a CCXML interpreter of the ADM 228c.

The programming script content includes flow of control directives and voice and/or text messages, such as included within VXML/CCXML that is interpreted by a VXML and/or a CCXML interpreter of the ADM 228c. The programming script content is determined from the aforementioned preferences associated with SMS protocol (DIDA) application.

For example, in one type of embodiment, the application server 310c supplies programming script content that includes a directive that transmits a voice message stating to the requester 102, "Please identify a person for which you seek contact information". The PAB ASM 228c communicates the aforementioned voice message to the requester 102.

In this use case scenario, the requester 102 responds by transmitting a voice communication that includes the vocalization "John Smith". The PAB ASM 228c receives and translates the vocalization via the automated speech recognition (ASM) module 332 (See FIG. 2) into text. (and transmits a communication 316c including the text to the PAB application server 310c.

The programming script content also includes directives that transmit a voice message stating to the requester 102, "Please identify the type of contact information that you seek." The requester 102 responds by transmitting a voice communication that includes the vocalization "all".

In one embodiment, the programming script directs an exchange of communications 312c to PAB data server (service node) 132c to access all contact information associated with "John Smith". The PAB data server receives a communication including a text representation of an entry for which information is sought by the requester 102.

In one embodiment, the programming script includes directive(s) to exchange communication(s) with the PAB data server 132c in order to retrieve all contact information associated with "John Smith" and to deliver the retrieved contact information to the user 102 by transmitting a voice communication stating (vocalizing) to the requester 102 the retrieved contact information. For example, voice communication states (vocalizes), "John Smith" "address is 14 Holland Street, Orlando, Fla." and "home telephone number is . . . " and "work telephone number is . . . " and "email address is . . .".

Other types of sessions between the user 102 and the PAB application, using the same principals as described above, are used to initially store, revise or delete contact information that is associated with various entities within the PAB application. Also, other sessions enable the user to gather "presence" (access status) information associated with entities of the PAB application.

In another use case scenario, a requester 102 can interact with the PAB application via a data initiated session. The user 102 of the device 100 transmits an SMS communication 572 to the SMS services node 130, via a communication channel 188. As previously described, an instance of the controller module 528 (FIG. 5) executes and operates to provide an interactive SMS protocol session between the associated requester (user) 102 and the SMS protocol (PAB) application and to obtain source information (SMS protocol source address of the device 100.

Transmission of a communication 326c from the SMS services node 130 to the PAB application server 130c requests delivery of a portion of programming script associated with the SMS (PAB) application. In some embodiments, the programming script is JAVA or C# programming script. In some embodiments, the application server 130 provides programming script for the SMS (PAB) application on an IP addressable port different from the port that supplies VXML/CCXML for the voice PAB application.

The communication 326c includes the source information associated with the requester 102, which is equal to the SMS protocol source address associated with the device 100. The application server 310c exchanges communications 322c, 324c with the personalization server 320 and the personalization server 320 supplies preference information to the application server 310c, as previously described (See FIG. 5).

The SMS PAB application server 310c processes the preference information in order to supply the portion of programming script requested by the communication 326c and later responds by transmitting a communication 328c to the SMS services node 130 that includes programming script having content that is determined from (reflecting) the preferences of the requester 102.

The SMS services node 130 exchanges communications 312c with the PAB service node (data server) 132c to access contact or other information associated with an entity as described above. Preferably, PAB data server 132c provides the same communication interface to both the ASM 228c via communications 314c and to the SMS services node 130.

In some embodiments, while interacting with the SMS PAB application, the requester 102 can request to establish an automated voice session with the PAB application via the PAB ASM 228c or directly with a live operator. An automated voice session is established using a procedure like that to establish operator assistance (SEE FIG. 3). A voice call is initiated to the PAB application port controlled by the PAB ASM 228c and a voice call is initiated the requester 102. The voice calls are then joined together. The requester 102 interacts with the PAB application in an automated and voice initiated manner as if the requester initiated a call to the voice initiated directory assistance (VIDA) application service.

Figure 7:
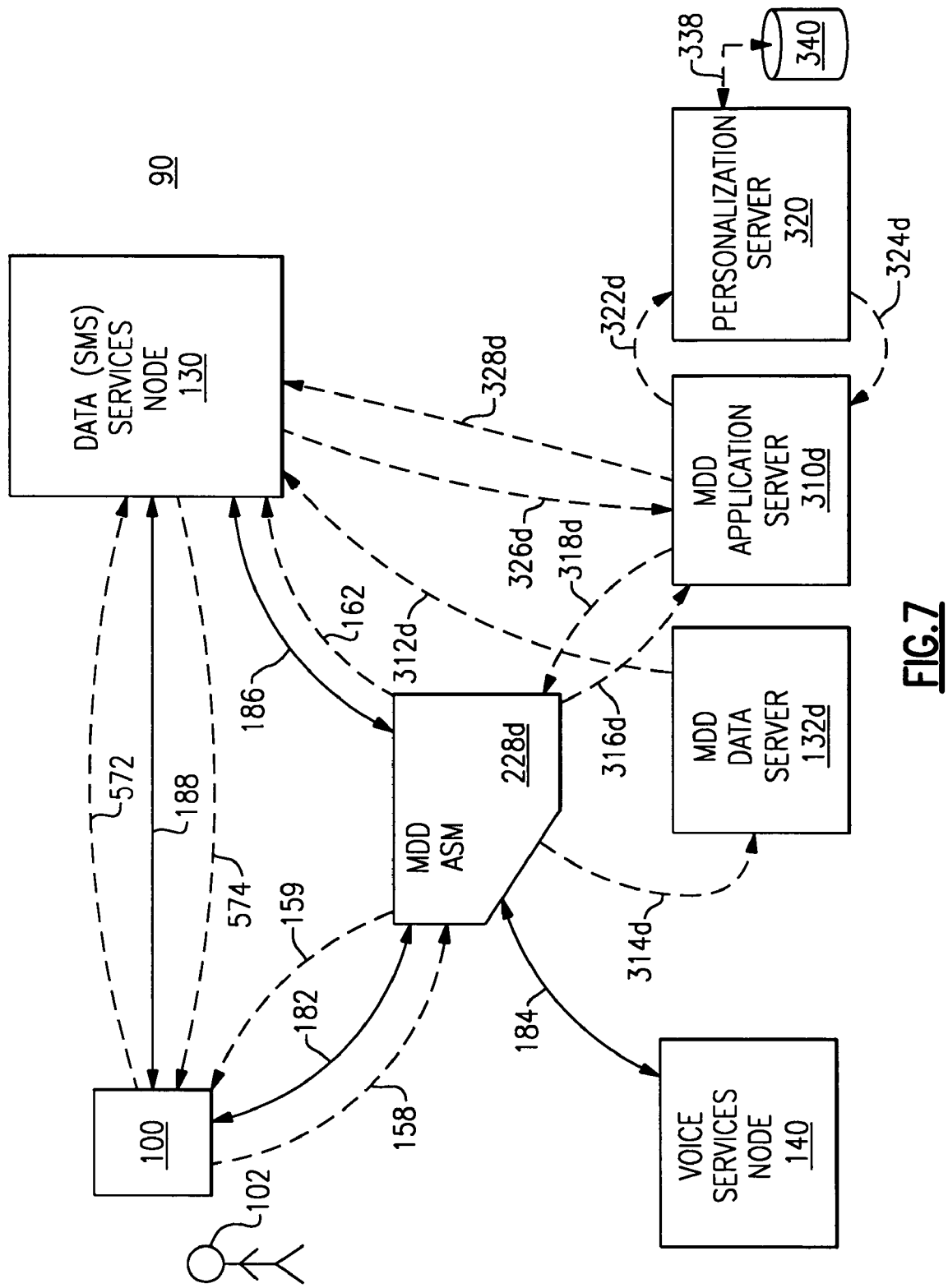
FIG. 7 is a block diagram illustrating the voice and data initiated operation of a map and driving directions (MDD) application that provides driving direction information to a requester (user) of the system.

FIG. 7 is a block diagram illustrating the voice and data initiated operation of a map and driving directions (MDD) application that provides driving direction information to a requester (user) 102 of the system 90. The MDD application enables a user 102 to access driving directions based upon an origin address and a destination address. Optionally, the MDD application can automatically determine the location of the requester 102 by determining the location of the communications device 100.

A requester 102 can interact with the MDD application via a voice initiated or a data initiated session. In the exemplary embodiment, the voice initiated operation of the MDD application employs an associated automated service module (ASM) 228d (Generally described in FIG. 2) and the data initiated operation of the MDD application employs the operation of the SMS data services node 130.

In one use case scenario, the user 102 of the device 100 initiates a voice call 158 to the MDD application and the MDD application responds to the voice call 158 in a manner like that described for the VIDA application (FIG. 3) and the PAB application (FIG. 6). An instance of the MDD automated service module 228d executes and operates to provide an interactive voice session between the associated requester (user) 102 and the MDD application. The automated service module 228d includes an instance of an ASM controlling module 330a and a VXML interpreter 330b (See FIG. 2).

As previously described, an instance of the ASM 228d (FIG. 2) executes and operates to provide an interactive voice session between the associated requester 102 and the PAB application and to obtain source information (ANI value) of the device 100.

The ASM 228d transmits a communication 316d to the MDD application server to request delivery of a portion of programming script associated with the MDD voice application. The communication 316b includes the source information associated with the requester 102, which is equal to the ANI associated with the device 100. The application server 310d exchanges communications 322d, 324d with the personalization server 320 and the personalization server 320 supplies preference information to the application server 310d, as described earlier (FIGS. 3, 6).

The MDD application server 310d processes the preference information in order to supply the portion of programming script, preferably VXML/CCXML, requested by the communication 316d and later responds by transmitting a communication 318d to the appropriate script (VXML/CCXML) interpreter within the MDD ASM 228d. The appropriate script includes content that is determined from the preferences of the requester 102.

The MDD ADM 228d exchanges communications with the MDD service node (data server) 132d to access a repository of MDD related information (data) (not shown) to process a particular request of the user 102. Optionally, the user 102 can request to establish a data session with the PAB application, which is established as described below.

In one type of embodiment, the MDD application server 310d extracts the preference information associated with individual preferences that are processed by the MDD application. In one exemplary type of embodiment, the MDD application server 310d extracts a preferred last origin address, last destination address, route, location based service, an automation level, delivery option, and a message format preference. The preferred delivery option and message format preferences influence the behavior the services provided by the MDD application in a manner like that previously described for the VIDA application (FIG. 3).

The last origin address preference indicates the default origin address for a determination of a set of driving directions. Likewise, the destination address preference indicates the default destination address for a determination of a set of driving directions. The route preference indicates whether shortest route with respect to distance or the quickest time route with respect to estimated time is determined for a set of driving directions. The location based service preference indicates whether the MDD application determines the user location automatically based on the location of the device 100 or is specified by the user 102.

The automation level preference can be set to none, partial or full. When set to none, a live operator interacts with the user 102. When set to partial, the user 102 specifies a telephone number associated with the destination address and the MDD application maps the telephone number into a destination address and further automatically determines the user location based on the location of the device 100, or else the user location is specified by the user 102. When set to full, the user 102 specifies an origin address and a destination address as input into the MDD application for it to determine a set of driving directions.

After processing the preferences of the requester 102, the MDD application server 310d responds to the communication 316d by transmitting a communication 318d to the automated service module 228d that includes programming script having content that is determined from the preferences of the requester 102. Preferably, the programming script content includes VXML/CCXML that is interpreted by a VXML and/or a CCXML interpreter of the ADM 228d.

The programming script content includes flow of control directives and voice and/or text messages, such as included within VXML/CCXML that is interpreted by a VXML and/or a CCXML interpreter of the ADM 228d. The programming script content is determined from the aforementioned preferences associated with MDD application.

For example, in one type of embodiment, the application server 310d supplies programming script content that includes a directive that transmits a voice message stating to the requester 102, "Please enter an origin address". The MDD ASM 228d communicates and aforementioned voice message to the requester 102.

In this use case scenario, the requester 102 responds by transmitting a voice communication that includes the vocalization "123 Smith Street, Atlanta, Ga.". The MDD ASM 228d receives and translates the vocalization into text and transmits a communication 316c including the text to the MDD application server 310d.

Upon receiving all required information, the application server 310d responds by supplying programming script content that includes directives that transmit a voice message stating to the requester 102 vocalizing driving directions".

Other sessions between the user 102 and the MDD application, using the same principals as described above, are used to supply various portions of information required to determine driving directions consistent with user preferences.

In another use case scenario, a requester 102 can interact with the MDD application via a data initiated session. The user 102 of the device 100 transmits an SMS communication 572 to the SMS services node 130, via a communication channel 188. As previously described, an instance of the controller module 528 (FIG. 5) executes and operates to provide an interactive SMS protocol session between the associated requester 102 and the SMS protocol (PAB) application and to obtain source information (SMS protocol source address of the device 100).

The data initiated session of the MDD application functions to interact with a requester 102 in a manner like that described for a data initiated session of the PAB application described in association with FIG. 6. Note that figure reference numbers for the MDD application (FIG. 7), including a suffix "d", represent like or analogous objects/actions within the PAB application (FIG. 6), including a suffix "c".

Figure 8:
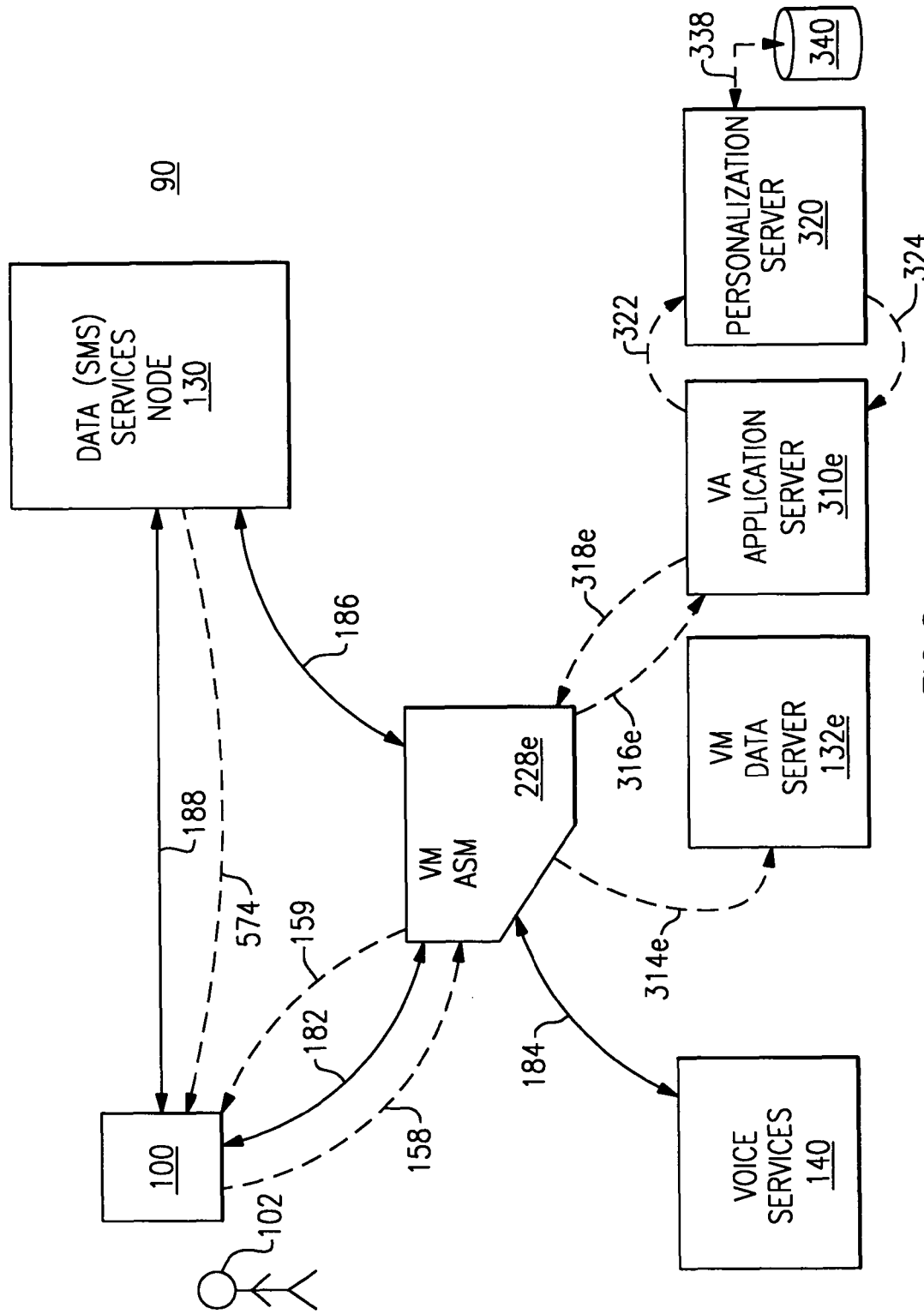
FIG. 8 is a block diagram illustrating a voice mail (VM) application that provides voice mail related services to a user of the system.

FIG. 8 is a block diagram illustrating a voice mail (VM) application that provides voice mail related services to a user 102 of the system 90. The VM application enables a user 102 to control a voice mailbox, to receive voice mail (calls) and to return call and/or forward voice mail from callers to the voice mailbox. Further the VM enables the requester (user) 102 to transmit personalized greetings, sound effects and audio skins (recordings) to callers accessing the WM application.

In the exemplary embodiment, a requester 102 interacts with the VM application via a voice initiated session. As shown, the voice initiated operation of the VM application employs an associated automated service module (ASM) 228e (Generally described in FIG. 2).

In one use case scenario, the user 102 of the device 100 initiates a voice call 158 to the VM application and the VM application responds to the voice call 158 in a manner like that described for the VIDA (FIG. 3), PAB (FIG. 6) and the MDD (FIG. 7) applications. An instance of the VM automated service module 228e executes and operates to provide an interactive voice session between the associated requester user) 102 and the VM application. The automated service module 228e includes an instance of an ASM controlling module 330a and a VXML interpreter 330b (See FIG. 2).

As previously described, an instance of the ASM 228e (FIG. 2) executes and operates to provide an interactive voice session between the associated requester 102 and the VM application and to obtain source information (ANI value) of the device 100.

The ASM 228d transmits a communication 316e to the VM application server to request delivery of a portion of programming script associated with the VM voice application. The communication 316e includes the source information associated with the requester 102, which is equal to the ANI associated with the device 100. The application server 310d exchanges communications 322e, 324e with the personalization server 320 and the personalization server 320 supplies preference information to the application server 310e, as described earlier (FIGS. 3, 6, 7).

The VM application server 310e processes the preference information in order to supply the portion of programming script (VXML/CCXML) requested by the communication 316e and later responds by transmitting a communication 318e to the appropriate script (VXML/CCXML) interpreter within the VM ASM 228e. The appropriate script includes content that is determined from the preferences of the requester 102.

The VM ASM exchanges communications with the VM service node (data server) 132e to access VM related information associated with a particular request of the user 102. In some embodiments, the user 102 can request to establish a data session with the VM application.

In one type of embodiment, the VM application server 310e extracts the preference information associated with individual preferences that are processed by the VM application. In one exemplary type of embodiment, the VM application server 310e extracts a preferred mailbox control option, forwarding option, call return option, caller-dependent personalized greeting(s), international greeting, sound effects and audio skins.

The mailbox control option preference indicates an order (flow sequence) of mailbox menus and an identity of custom key presses or speech commands (if automatic speech recognition enabled) to perform voice mail operations such as listen, rewind, fast-forward, save and delete.

The forwarding option preference indicates whether voice mails are automatically forwarded as email, each having an attached audio recording (.WAV file) of a received voice mail, directed to an email queue of the user 102 and/or of a personal assistant of the user 102. The forwarding option also indicates whether pre-determined replies are automatically transmitted to callers via a voice or SMS data communication, according to calling line identification (CLI) rules.

The preferred call return option preference indicates an identity of, and whether, a single key press by the user 102, automatically transmits a return call to a voice mail caller while the user 102 is listening to voice mail messages. Further, the preferred call return option enables the user 102 to indicate what pre-determined messages can be transmitted as a return call to a voice mail caller, automatically based upon a personal address book (PAB) information or on demand via on a single key press. For example, the user 102 can transmit pre-determined messages such as "Got your message" and "I will call you later" to voice mail callers.

The caller dependent personalized greetings preference indicates an association of pre-determined audio greetings with calling line identification (CLI) values. For example, a first greeting can be assigned and played for a friend having a first CLI value and a second and different greeting can be assigned and played for a friend having a second CLI value.

The international greeting preference indicates an association of a pre-determined audio greeting with an international calling line identification (CLI) value. For example, an international greeting can be assigned for calls that are originated outside of the United States that are received by a mailbox answering to a telephone number located within the United States.

The personal sound effects preference indicates whether and what sound effects are pre-pended or appended to voice messages that the user 102 leaves for others. The user 102 can select from various sound effects of various categories including common, comic and frightening sound effects.

The personal audio skins preference indicates a selection of a system default voice among various audio recordings. The various audio recordings include those classified as special effects, music, humor, movies, celebrities and language.

After processing the preferences of the requester 102, the VM application server 310e responds to the communication 316e by transmitting a communication 318e to the automated service module 228e that includes programming script content that is determined from the preferences of the requester 102. Preferably, the programming script content includes VXML/CCXML that is interpreted by a VXML and/or a CCXML interpreter of the ADM 228c.

The programming script content includes flow of control directives and voice and/or text messages, such as included within VXML/CCXML that is interpreted by a VXML and/or a CCXML interpreter of the ADM 228e and that is determined from the aforementioned preferences associated with VM application.

In a preferred embodiment, the application server 310e supplies programming script that directs the VM ASM 228e to transmit, receive and process voice messages and audio signals within an interactive voice session for operating the above described VM application. Various types of sessions between the user 102 and the VM application, using the same principals as described above, can be used to exchange information required to provide voice mail related services.

The aforementioned description of the VM application provides examples of how personal preferences can influence the behavior of an application service provided by the system 90. The programming script supplied by the VM application server 310e and processed within the VM ASM 228e, reflects the personal preferences of the requester 102.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A system for personalizing the provision of an interactive service to a user of a data and/or voice enabled communication device, comprising:
    a requester identifying apparatus that is configured to obtain source information associated with a request for a service that is associated with a user and that is communicated via at least one of a plurality of types of communications channels;
    one or more applications that are configured to direct an interactive session between said system providing said service and a requester via at least one of a plurality of types of communications channels, said interactive session having a path of control that is directed, at least in part, by digital logic residing within said one or more applications;
    providing a personalization module that is configured to access personalizing information associated with said source information and that is configured to provide said personalizing information as an input to a determination of at least a portion of said digital logic residing within said one or more applications;
    wherein said personalization information identifies one or more preference, the one or more preference including at least one of: an automation level and an update method.

2. The system of claim 1 where a first type of communications channel is a voice type of communications channel and a second type of communications channel is a data type of communications channel.

3. The system of claim 2 where said source information associated with a request for service that is communicated via said voice type of communications channel includes an automatic number identification (ANI) value.

4. The system of claim 2 where said source information associated with a request for service that is communicated via said data type of communications channel includes an SMS source address value.

5. The system of claim 2 where said requester transmits a request for service via said first type of communications channel and said one or more applications later transmits a communication to said requester via said second type of communications channel.

6. The system of claim 5 where said first type of communications channel is a voice type of communications channel and where said second type of communications channel is a voice type of communications channel.

7. The system of claim 5 where said first type of communications channel is a voice type of communications channel and where said second type of communications channel is a data type of communications channel.

8. The system of claim 5 where said first type of communications channel is a data type of communications channel and where said second type of communications channel is a data type of communications channel.

9. The system of claim 5 where said first type of communications channel is a data type of communications channel and where said second type of communications channel is a voice type of communications channel.

10. The system of claim 1 where said personalization module functions as a repository of information that can be accessed and revised by said requester via an network accessible graphical user interface.

11. The system of claim 1 where said user is classified as being associated with a particular group of users, and where said group of users has a group characteristic and where at least some personalization information associated with said user is determined by said group characteristic.

12. The system of claim 1 where some personalization information for said user is determined from heuristic measurements of prior communications between said system and said user.

13. The system of claim 1 where a search request is communicated to said personalization module and where said personalization module responds to said search request by transmitting said personalization information associated with said source information, and where said search request includes said source information and/or said user identity.

14. The system of claim 1 where said one or more application provides a voice initiated directory assistance service to a user.

15. The system of claim 1 where said one or more application provides a data initiated directory assistance service to a user.

16. The system of claim 15 where said personalization information identifies preferences including at least one of a delivery option, a redirect option, a message format, an update method, an operator backing and an enhanced content preference.

17. The system of claim 1 where said one or more application provides a personal address book and/or calendar service to a user.

18. The system of claim 17 where said personalization information identifies preferences including at least one of a language, a custom prompt, a delivery option, a message format, an update method, a validation interval and a calendar alert preference.

19. The system of claim 1 where said one or more application provides a map and driving directions service to a user.

20. The system of claim 19 where said personalization information identifies preferences including at least one of a last origin address, a last destination address, a preferred route, a location based service (LBS) option, an automation level, a delivery option, a message format preference.

21. The system of claim 1 where said one or more application provides a voice mail service to a user.

22. The system of claim 21 where said personalization information identifies preferences including at least one of a caller dependent greeting, an international greeting, a call return option, message sound effects, personal audio skins, a mailbox control and a personal forwarding option preference.

23. The system of claim 1 where said one or more preference includes an automation level.

24. The system of claim 1 where said one or more preference includes a message format.

25. The system of claim 1 where said one or more preference includes an update method.

26. The system of claim 1 where said one or more preference includes an enhanced content preference.

27. The system of claim 1 where said one or more application provides to a user at least one of: a data initiated directory assistance service, a personal address book service, a calendar service, a map and driving directions service, a voice mail service.

28. The system of claim 1, wherein said determination is a resulting voice XML (VXML) script conditioned upon said one or more preference.

29. The system of claim 1, wherein said determination is a resulting call control extensible markup language (CCXML) script conditioned upon said one or more preference.

30. A method for personalizing the provision of an interactive service to a user of a data and/or voice enabled communication device, comprising:
providing a requester identifying apparatus that is configured to obtain source information associated with a request for a service that is associated with a requester;
providing one or more applications that are configured to direct an interactive session between said system providing said service and said requester, said interactive session having a path of control that is directed, at least in part, by digital logic residing within said one or more applications;
providing a personalization module that is configured to access personalizing information associated with said source information and that is configured to provide said personalizing information as an input to a determination of at least a portion of said digital logic residing within said one or more applications;
wherein said personalization information identifies one or more preference, the one or more preference including at least one of: an automation level and an update method.

31. A system for personalizing the provision of an interactive service to a user of a data and/or voice enabled communication device, comprising:
a plurality of first types of communications channels;
a requester identifying apparatus that is configured to obtain source information associated with a request for a service that is associated with a user and that is communicated via at least one of the first types of communications channels;
a plurality of second types of communications channels;
one or more applications that are configured to direct an interactive session between said system providing said service and a requester via at least one of the second types of communications channels, said interactive session having a path of control that is directed, at least in part, by digital logic residing within said one or more applications;
providing a personalization module that is configured to access personalizing information associated with said source information and that is configured to provide said personalizing information as an input to a determination of at least a portion of said digital logic residing within said one or more applications;
wherein a call control extensible markup language (CCXML) script is used to control an interactive session between said one or more applications and said requester.

32. The system of claim 31 where a first type of communication channel is a voice type of communication channel and a second type of communications channel is a data type of communications channel.

33. The system of claim 31 where said source information associated with a request for service that is communicated via said voice type of communications channel includes an automatic number identification (ANI) value.

34. The system of claim 31 where said source information associated with a request for service that is communicated via said data type of communications channel includes a short message service (SMS) source address value.

35. The system of claim 31 where a search request is communicated to said personalization module and where said personalization module responds to said search request by transmitting said personalization information associated with said source information, and where said search request includes said source information and/or said user identity.

36. The system of claim 31 where said at least one said application provides a voice initiated directory assistance service to a user.

37. The system of claim 31 where said personalization information identifies preferences including at least one of a language, a custom prompt, an automation level, delivery options, a redirect option, a message format, an update method and an enhanced content preference.

38. The system of claim 31, wherein said determination is a resulting CCXML script conditioned upon said one or more preference.

39. A system for personalizing the provision of an interactive service to a user of a data and/or voice enabled communication device, comprising:
a plurality of first types of communications channels;
a requester identifying apparatus that is configured to obtain source information associated with a request for a service that is associated with a user and that is communicated via at least one of the first types of communications channels;
a plurality of second types of communications channels;
one or more applications that are configured to direct an interactive session between said system providing said service and a requester via at least one of the second types of communications channels, said interactive session having a path of control that is directed, at least in part, by digital logic residing within said one or more applications;

providing a personalization module that is configured to access personalizing information associated with said source information and that is configured to provide said personalizing information as an input to a determination of at least a portion of said digital logic residing within said one or more applications;

wherein said personalization information identifies one or more preference, the one or more preference including at least one of: an automation level, a message format, an update method, and an enhanced content preference.

40. The system of claim 39 where a first channel type of said first types of communications channels is a voice type of communications channel and a second channel type of said second types of communications channels is a data type of communications channel.

41. The system of claim 40 where said source information associated with a request for service that is communicated via said voice type of communications channel includes an automatic number identification (ANI) value.

42. The system of claim 40 where said source information associated with a request for service that is communicated via said data type of communications channel includes an SMS source address value.

43. The system of claim 40 where said requester transmits a request for service via said first channel type and said one or more applications later transmits a communication to said requester via the second channel type.

44. The system of claim 39 where said personalization module functions as a repository of information that can be accessed and revised by said requester via a network accessible graphical user interface.

45. The system of claim 39 where said user is classified as being associated with a particular group of users, and where said group of users has a group characteristic and where at least some personalization information associated with said user is determined by said group characteristic.

46. The system of claim 39 where some personalization information for said user is determined from heuristic measurements of prior communications between said system and said user.

47. The system of claim 39 where a search request is communicated to said personalization module and where said personalization module responds to said search request by transmitting said personalization information associated with said source information, and where said search request includes said source information and/or said user identity.

48. The system of claim 39 where said one or more applications provides a voice initiated directory assistance service to a user.

49. The system of claim 39 where said one or more applications provides a data initiated directory assistance service to a user.

50. The system of claim 49 where said personalization information identifies preferences including at least one of a delivery option, a redirect option, a message format, an update method, an operator backing and an enhanced content preference.

51. The system of claim 39 where said at least one or more applications provides a personal address book and/or calendar service to a user.

52. The system of claim 51 where said personalization information identifies preferences including at least one of a language, a custom prompt, a delivery option, a message format, an update method, a validation interval and a calendar alert preference.

53. The system of claim 39 where said one or more applications provides a map and driving directions service to a user.

54. The system of claim 53 where said personalization information identifies preferences including at least one of a last origin address, a last destination address, a preferred route, a location based service (LBS) option, an automation level, a delivery option, a message format preference.

55. The system of claim 39 where said one or more applications provides a voice mail service to a user.

56. The system of claim 55 where said personalization information identifies preferences including at least one of a caller dependent greeting, an international greeting, a call return option, message sound effects, personal audio skins, a mailbox control and a personal forwarding option preference.

57. A method for personalizing the provision of an interactive service to a user of a data and/or voice enabled communication device, comprising:

providing a plurality of first types of communications channels;

providing a requester identifying apparatus that is configured to obtain source information associated with a request for a service that is associated with a requester and that is communicated via at least one of the first types of communications channels;

providing a plurality of second types of communications channels;

providing one or more applications that are configured to direct an interactive session between said system providing said service and said requester via at least one the second types of communications channels, said interactive session having a path of control that is directed, at least in part, by digital logic residing within said one or more applications;

providing a personalization module that is configured to access personalizing information associated with said source information and that is configured to provide said personalizing information as an input to a determination of at least a portion of said digital logic residing within said one or more applications;

wherein said personalization information identifies one or more preference, the one or more preference including at least one of: an automation level, a message format, an update method, and an enhanced content preference.

* * * * *